(12) United States Patent
Chambers et al.

(10) Patent No.: US 9,957,341 B2
(45) Date of Patent: May 1, 2018

(54) BIODEGRADABLE ABSORBENT MATERIAL AND METHOD OF MANUFACTURE

(71) Applicants: William Chambers, Lebanon, OR (US); Paul McClelland, Monmouth, OR (US)

(72) Inventors: William Chambers, Lebanon, OR (US); Paul McClelland, Monmouth, OR (US)

( * ) Notice: Subject to any disclaimer, the term of this patent is extended or adjusted under 35 U.S.C. 154(b) by 228 days.

(21) Appl. No.: 14/884,172

(22) Filed: Oct. 15, 2015

(65) Prior Publication Data

US 2016/0185891 A1 Jun. 30, 2016

Related U.S. Application Data

(63) Continuation-in-part of application No. 13/936,598, filed on Jul. 8, 2013, now Pat. No. 9,181,377, which is a continuation of application No. 12/797,259, filed on Jun. 9, 2010, now Pat. No. 8,507,607.

(60) Provisional application No. 61/268,228, filed on Jun. 9, 2009, provisional application No. 62/215,361, filed on Sep. 8, 2015.

(51) Int. Cl.
| | |
|---|---|
| *C08F 251/00* | (2006.01) |
| *C08F 251/02* | (2006.01) |
| *B01J 20/26* | (2006.01) |
| *C08B 31/00* | (2006.01) |
| *C08B 37/08* | (2006.01) |

(52) U.S. Cl.
CPC .......... *C08F 251/00* (2013.01); *B01J 20/264* (2013.01); *C08B 31/006* (2013.01); *C08B 37/003* (2013.01); *C08F 251/02* (2013.01); *C08L 2201/06* (2013.01)

(58) Field of Classification Search
CPC .............. C08F 251/02; C08F 222/1006; C08L 2201/06

See application file for complete search history.

(56) References Cited

U.S. PATENT DOCUMENTS

| | | |
|---|---|---|
| 5,856,370 A | 1/1999 | Chmelir |
| 6,060,557 A | 5/2000 | Dahmen et al. |
| 6,602,950 B1 | 8/2003 | Dentler et al. |
| 8,975,387 B1 * | 3/2015 | Venditti .................. C08B 31/04 536/102 |

(Continued)

FOREIGN PATENT DOCUMENTS

WO 168156 9/2001

*Primary Examiner* — Mark S Kaucher
(74) *Attorney, Agent, or Firm* — Edward E. Sowers; Brannon Sowers & Cracraft PC

(57) ABSTRACT

Biodegradable graft copolymers derived from a carbohydrate, including nitrogen-containing carbohydrates and modified carbohydrates, and at least one $\alpha,\beta$-unsaturated carboxylic acid derivative having superabsorbent properties are disclosed in addition to the substantially adiabatic polymerization process by which the graft copolymers are made. The methods disclosed can be carried out in a variety of currently available stirred and/or continuous commercial reactors. Polymerizations carried out with starch have surprisingly produced substantially quantitative yields of graft copolymer free of residual monomer produced as a moist copolymer. Product work-up typically involves an optional neutralization and drying.

22 Claims, 9 Drawing Sheets

(56) References Cited

U.S. PATENT DOCUMENTS

2003/0027964 A1 2/2003 Quadir et al.
2006/0047068 A1 3/2006 Doane et al.

* cited by examiner

BIODEGRADABLE ABSORBENT MATERIAL AND METHOD OF MANUFACTURE

CROSS-REFERENCES TO RELATED APPLICATIONS

This application is a continuation-in-part of application Ser. No. 13/936,598 filed on Jul. 8, 2013, which is a continuation application of application Ser. No. 12/797,259 filed on Jun. 9, 2010 (which issued as U.S. Pat. No. 8,507,607 on Aug. 13, 2013), entitled BIODEGRADABLE ABSORBENT MATERIAL AND METHOD OF MANUFACTURE, which claims priority to U.S. Provisional Patent Application No. 61/268,228, entitled ECO-FRIENDLY ABSORBENT MATERIAL AND METHOD OF MANUFACTURE, filed Jun. 9, 2009. The subject application claims priority to Provisional Patent Application No. 62/215,361 filed on Sep. 8, 2015, entitled BIODEGRADABLE ABSORBENT MATERIAL AND METHOD OF MANUFACTURE, to application Ser. No. 13/936,598, to application Ser. No. 12/797,259, and Provisional Patent Application No. 61/268,228, and incorporates all by reference herein, in their entirety.

TECHNICAL FIELD

The present disclosure relates to biodegradable graft copolymers for use as superabsorbent polymers and related applications and to methods for making the graft copolymers.

BACKGROUND

Superabsorbent polymers (SAP's) are materials that imbibe or absorb at least 10 times their own weight in aqueous fluid and that retain the imbibed or absorbed aqueous fluid under moderate pressure. The imbibed or absorbed aqueous fluid is taken into the molecular structure of the SAP rather than being contained in pores from which the fluid could be eliminated by squeezing. Some specialty SAP's can absorb up to 1,000 times their weight in aqueous fluid. The present application is directed to: (1) a graft polymerization method suitable for preparing biodegradable SAP's and biodegradable polymers suitable for other applications, and (2) the novel graft copolymers produced by these methods.

One method of producing a SAP involves graft polymerizing acrylonitrile onto a starch in the presence of an initiator, such as a ceric (+4) salt, to form a starch graft copolymer, and saponifying the nitrile groups with an alkali metal to form a saponificate having alkali carboxylate and carboxamide groups.

Saponification, however, requires expensive machinery and generates ammonia, which can be corrosive, costly to remove, and expensive to recover and/or dispose of. Also, potassium hydroxide (KOH) added during saponification makes the saponified starch graft copolymer mixture basic and provides a product mixture that is both viscous and sticky. An acid, e.g., hydrochloric acid, nitric acid, sulfuric acid, or phosphoric acid, must be added to the basic mixture to neutralize the excess base and adjust the mixture's pH to about 7.5 for most applications. Finally, the sticky and viscous material must be pumped into large volumes of methanol and undergo several chopping steps to remove dissolved salts and transform the polymer into a workable form. The resulting waste solutions can also be expensive to dispose of because they include potassium and ammonium salts and other extraneous materials. More particularly, wastes containing acrylonitrile can be hazardous and similarly expensive to dispose of. The isolation of one pound of polymer can require as much as 3 gallons of methanol. As a result, a 10 million pound SAP/year plant can require as much as 30 million gallons/year of methanol. The loss of only 1% of the required methanol could introduce as much as 300,000 pounds/year of methanol into the environment.

A more recent method described in U.S. Pat. No. 7,459,501 was developed for producing a SAP and involves graft polymerizing a monomer (acrylic acid or its ester, optionally including acrylamide) onto a starch in the presence of a cross-linker and an initiator under isothermal conditions. The batch method involved combining the reactants in water, heating the mixture to about 170° F., and maintaining that temperature for about 15 minutes. The resulting viscous mass was neutralized with base and isolated after adding large volumes of methanol to convert the viscous mass into a physical form that can be processed. Although this method of producing a SAP avoids a saponification process, handling acrylonitrile, and recovering large volumes of ammonia, the need to utilize and recover large amounts of methanol (or other lower alcohol) remains and the process cannot be carried out as a continuous process because of the viscous and sticky nature of the initially formed graft copolymer product. Without the use of an alcohol in the product isolation step, the polymer produced is not a flowable product and remains too viscous and sticky to be processed by currently available equipment, even in a batch process.

What is needed is a high purity biodegradable SAP and related polymers having a range of absorbances and other properties, and a method for making the polymers with high conversions from readily available starting materials. The process should be capable of being carried out in a continuous manner utilizing currently available production equipment to directly produce large volumes of the polymer and allow for its direct isolation without the need to handle toxic materials or recycle large volumes of hazardous gases and/or solvents. In addition, SAP's can be prepared with varying degrees of biodegradable to make products including SAP's more compatible with the environment. The present disclosure addresses these needs.

SUMMARY

The present disclosure provides for biodegradable superabsorbent polymer products produced directly in high purity from readily available starting materials with minimal processing and without further purification and a method for their production suitable for large scale commercial production in currently available commercial equipment. The method disclosed does not utilize acrylonitrile, does not require saponification generating large volumes of ammonia, nor are large volumes of methanol or other lower alcohols required to effectuate work-up of a viscous mass of initially formed polymer.

A first aspect of the present disclosure includes a process for the formation of a graft copolymer which involves: (1) combining water, a carbohydrate, at least one α,β-unsaturated carboxylic acid derivative, and a catalyst to form a combination having initiation conditions; (2) introducing the combination to a reactor having a reaction zone providing initiation conditions, and (3) forming the graft copolymer therein under substantially adiabatic conditions to provide a free-flowing copolymer. The reaction is typically completed within about 5 minutes or less, more typically within about 3 minutes or less, and even more typically in about 1 minute or less. The α,β-unsaturated carboxylic acid derivative is selected from the group consisting of an acid, an ester, an amide (or amidine), and a salt, and the catalyst is a catalyst or catalyst system capable of initiating polymerization when the combination experiences initiation conditions. Suitable combinations can further contain additional monomers and/or cross-linking agents. Typically the catalyst initiates polymerization by decomposing to generate free radicals either thermally or chemically. Because once the polymerization is initiated, it is completed within a few seconds to a few minutes, the heat of polymerization is generated faster than it can be removed, and the process becomes substantially adiabatic.

For a thermally initiated polymerization, the initiation conditions generally include a temperature equal to or greater than the activation temperature and sufficient to abruptly initiate polymerization and cause it to rapidly proceed in an exothermic manner. For a thermally initiated polymerization, activation condition refers to a composition temperature sufficient to initiate polymerization. For a chemically initiated polymerization, the initiation conditions generally include the presence of at least one monomer and all necessary catalyst components to abruptly initiate polymerization and cause it to rapidly proceed in an exothermic manner.

The reactor's reaction zone is a region capable of initiating a substantially adiabatic polymerization by (1) rapidly increasing the combination's temperature to or above the combination's activation temperature or (2) initiating chemically induced polymerization. Although preferred reaction zones for thermally induced polymerization include heated surface regions of the reactor, reaction zones can also utilize other methods to increase the temperature of the combination, such as for example, microwave radiation, infrared radiation, steam injection, and the like positioned within or along the initiation zone. Chemical induction is generally accomplished by combining and mixing the components necessary to initiate polymerization.

A further aspect of the present disclosure includes a process for the formation of a graft copolymer which involves: (1) combining water, a carbohydrate, at least one α,β-unsaturated carboxylic acid derivative, and a catalyst to form a combination having a current temperature and an activation temperature; and (2) causing the combination's current temperature to equal or exceed the activation temperature to effect a substantially adiabatic polymerization and provide a free-flowing copolymer. The α,β-unsaturated carboxylic acid derivative can be selected from the group consisting of an acid, an ester, an amide (or amidine), and a salt, and said catalyst is a catalyst or catalyst system capable of decomposing to generate free radicals either thermally or chemically. Once the polymerization is initiated, it is typically completed within a reaction time of only seconds to a few minutes. Because the heat of polymerization is generated so much faster than it can be removed, the process becomes substantially adiabatic. Suitable combinations can further contain additional monomers and/or cross-linking agents.

A still further aspect of the present disclosure involves a method for forming a graft copolymer which involves: (1) combining water, a carbohydrate, at least one α,β-unsaturated carboxylic acid derivative and a catalyst to form a combination having an activation temperature; and (b) contacting the combination with a surface heated to a temperature at or above the activation temperature to initiate polymerization and complete polymer formation under substantially adiabatic conditions within less than about 5 minutes (following initiation) to provide a free-flowing copolymer. Appropriate α,β-unsaturated carboxylic acid derivative can be selected from the group consisting of an acid, an ester, an amide (or amidine), and a salt, and the catalyst is capable of initiating polymerization when subjected to initiation conditions. Suitable combinations can further contain additional monomers and/or cross-linking agents. Reactors capable of providing a suitable heated surface include, but are not limited to a thermal screw, a heated drum, and a belt reactor.

A still further aspect of the present disclosure involves a method for forming a graft copolymer which involves: (1) combining water, a carbohydrate, at least one α,β-unsaturated carboxylic acid derivative and a first catalyst component to form a combination; and (2) providing the combination with a second catalyst component to initiate a chemically induced substantially adiabatic polymerization and provide a free-flowing copolymer. Suitable α,β-unsaturated carboxylic acid derivative can be selected from the group consisting of an acid, an ester, an amide (or amidine), and a salt, and the first catalyst component is capable of decomposing, upon combination with the second catalyst component, to initiate polymerization. Suitable combinations can further contain additional monomers and/or cross-linking agents.

A still further aspect of the present disclosure involves a method for forming a graft copolymer which includes: (1) combining water, at least two carbohydrates, at least one α,β-unsaturated carboxylic acid derivative and a catalyst to form a combination having a current temperature and an activation temperature; and (2) causing the current temperature to sufficiently exceed the activation temperature to thermally initiate a substantially adiabatic polymerization. The at least two carbohydrates include a first carbohydrate that can be a starch and second carbohydrate that is a nitrogen-containing carbohydrate. Examples of the first carbohydrate include, but are not limited to, native starch, oxidized starch, starch esters including carboxy alkyl starches, galactomannans, glucomannans, cellulose esters, and hemicelluloses. The second carbohydrate can include a nitrogen containing carbohydrate including, but not limited to chitosans (polyglucosamine), modified chitosans, hyaluronate amine, dextran amine, alginate amine, and heparin amine. The α,β-unsaturated carboxylic acid derivative is selected from the group consisting of an acid, an ester, an amide (or amidine), and a salt, and the catalyst is capable of thermally initiating polymerization when the activation temperature is achieved. One or both of the at least two carbohydrates can be modified by the methods including, but not limited to oxidation and/or acid-modification prior to polymerization. Suitable combinations can further contain additional monomers and/or cross-linking agents. Suitable cross-linking agents can include, but are not limited to N,N'-methylenebis(meth)acrylamide, methacrylamide, glycidyl methacrylate, lysine, histidine, glutaraldehyde, and arginine. Typically the catalyst initiates polymerization by decomposing to thermally generate free radicals. Because once the polymerization is initiated, it is completed within a few seconds to a few minutes, the heat of polymerization is generated faster than it can be removed, and the process becomes substantially adiabatic upon initiation.

A still further aspect of the present disclosure involves a method for forming a graft copolymer which involves: (1) combining water, a modified carbohydrate, at least one α,β-unsaturated carboxylic acid derivative and a catalyst to form a combination having a current temperature and an activation temperature; and (2) causing the current temperature to sufficiently exceed the activation temperature to thermally initiate a substantially adiabatic polymerization. Examples of suitable modified carbohydrates include, but are not limited to a modified starch and/or a modified nitrogen-containing carbohydrate. Suitable nitrogen-containing carbohydrates include, but are not limited to amine-containing carbohydrates. The α,β-unsaturated carboxylic acid derivative is selected from the group consisting of an acid, an ester, an amide (or amidine), and a salt, and the catalyst is capable of thermally initiating polymerization when the activation temperature is achieved. The modified carbohydrate can be modified by methods including, but not limited to oxidation and/or acid-modification. Suitable combinations can further contain additional monomers and/or cross-linking agents. Typically the catalyst initiates polymerization by decomposing to thermally generate free radicals. Because once the polymerization is initiated, it is completed within a few seconds to a few minutes, the heat of polymerization is generated faster than it can be removed, and the process becomes substantially adiabatic upon initiation.

A still further aspect of the present disclosure involves a method for forming a graft copolymer which involves: (1) combining water, a carbohydrate, particularly a polysaccharide, and at least one α,β-unsaturated carboxylic acid derivative to form a combination having a current temperature; (2) providing a catalyst having an activation temperature; (3) introducing the catalyst to the combination having a current temperature of at least the catalyst's activation temperature to thermally initiate a substantially adiabatic polymerization. Examples of suitable carbohydrates include, but are not limited to starch, a modified starch, a nitrogen-containing carbohydrate (including an amine-containing carbohydrate). Suitable nitrogen-containing carbohydrates include, but are not limited to amine-containing carbohydrates. The α,β-unsaturated carboxylic acid derivative is selected from the group consisting of an acid, an ester, an amide (or amidine), and a salt, and the catalyst is a catalyst or catalyst system including more than one catalyst, capable of thermally initiating polymerization when the activation temperature is achieved. The modified carbohydrate can be modified by the methods including, but not limited to oxidation and/or acid-modification. Suitable combinations can further contain additional monomers and/or cross-linking agents. Typically the catalyst initiates polymerization by decomposing to thermally generate free radicals. Because once the polymerization is initiated, it is completed within a few seconds to a few minutes, the heat of polymerization is generated faster than it can be removed, and the process becomes substantially adiabatic upon initiation.

A still further aspect of the present disclosure involves a polymer having units derived from an α,β-unsaturated carboxylic acid derivative, and at least two carbohydrates, where the first carbohydrate is a starch, the second carbohydrate is an nitrogen-containing carbohydrate, and at least one of the carbohydrates is a modified carbohydrate. The α,β-unsaturated carboxylic acid derivative is selected from the group consisting of an acid, an ester, an amine, an amidine, and a salt. Modified carbohydrates can include, but are not limited to a starch, or a nitrogen-containing carbohydrate such as an amine-containing carbohydrate modified by oxidation or an acid-treatment or modification. Examples of carbohydrates which can be modified include, but are not limited to, native starch, oxidized starch, starch esters including carboxy alkyl starches, galactomannans, glucomannans, cellulose esters, hemicelluloses, chitosans (polyglucosamine), modified chitosans, hyaluronate amine, dextran amine, alginate amine, and heparin amine. Polymers according to this disclosure can be linear or cross-linked. Examples of cross-linking agents include, but are not limited to N,N'-methylenebis(meth)acrylamide, methacrylamide, glycidyl methacrylate, lysine, histidine and arginine. The inclusion of a modified carbohydrate into a superadsorbent polymer can be determined by FTIR.

A still further aspect of the present disclosure involves a polymer having units derived from an α,β-unsaturated carboxylic acid derivative, two carbohydrates, where the first carbohydrate is a starch, the second carbohydrate is a nitrogen-containing carbohydrate, and at least one of the carbohydrates is a modified carbohydrate. The α,β-unsaturated carboxylic acid derivative is selected from the group consisting of an acid, an ester, an amine, an amidine, and a salt. Modified carbohydrates can include, but are not limited to a modified starch, or a modified nitrogen-containing carbohydrate such as a modified amine-containing carbohydrate. Modified carbohydrates typically include aldehyde or ketone groups, and depending on the level of modification can include saccharide oligomers. Polymers according to this disclosure can be linear or cross-linked. Examples of cross-linking agents include, but are not limited to N,N'-methylenebis(meth)acrylamide, methacrylamide, glycidyl methacrylate, lysine, histidine and arginine.

A still further aspect of the present disclosure involves a polymer having units derived from an α,β-unsaturated carboxylic acid derivative and a modified carbohydrate wherein the α,β-unsaturated carboxylic acid derivative is selected from the group consisting of an acid, an ester, an amine, an amidine, and a salt. Modified carbohydrates typically include aldehyde or ketone groups, and depending on the level of modification can include saccharide oligomers. Polymers according to this disclosure can be linear or cross-linked. Examples of cross-linking agents include, but are not limited to N,N'-methylenebis(meth)acrylamide, methacrylamide, glycidyl methacrylate, lysine, histidine and arginine.

Examples of nitrogen-containing carbohydrates include, but are not limited to the following amine-containing carbohydrates:

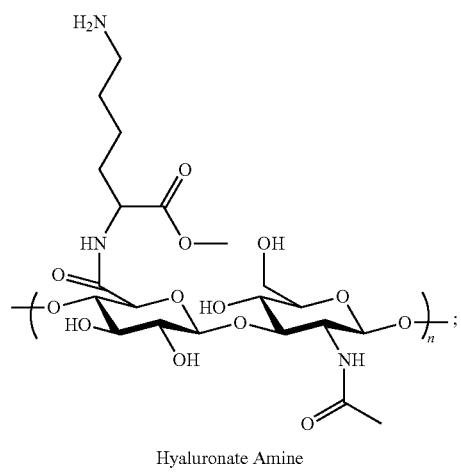

Hyaluronate Amine

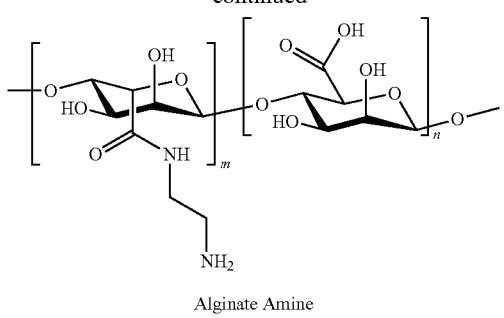

Alginate Amine

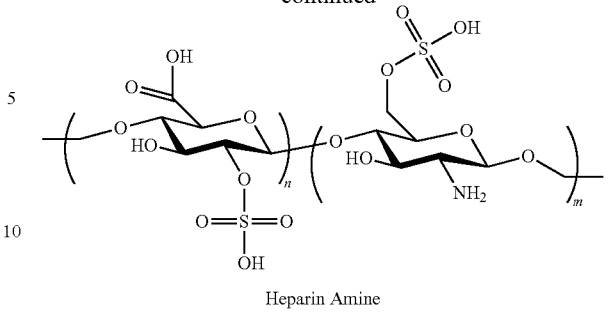

Heparin Amine

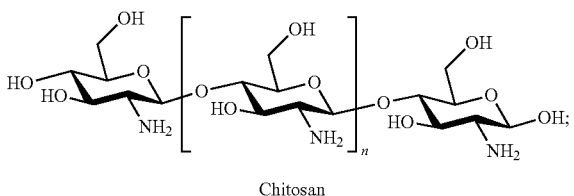

Chitosan

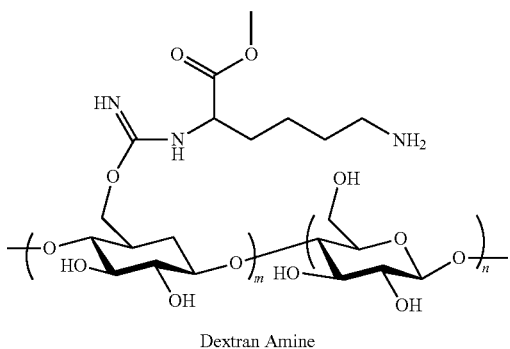

Dextran Amine

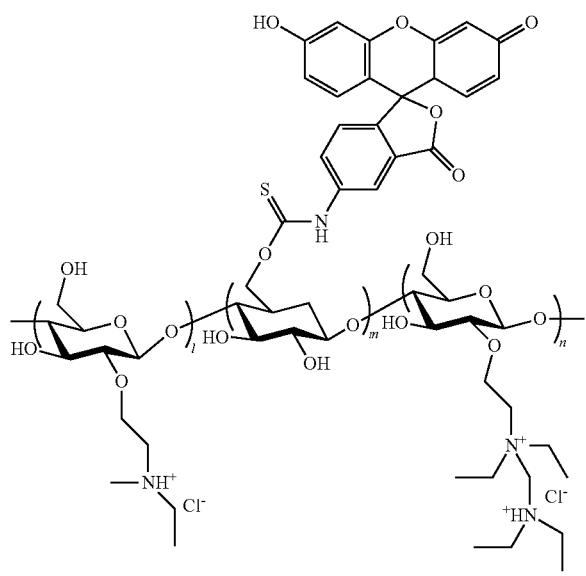

Dextran Fluorescein and

For graft copolymers, particularly SAP's, containing acidic carboxyl groups, neutralization of the initially formed SAP, when desired, can be carried out with a base. The initially formed SAP can be directly neutralized and dried within or upon the reactor system and the resulting dry polymer granulated, pelletized, extruded, or otherwise processed before packaging. To date, neutralizations have been carried out by treatment of the initially formed SAP with aqueous solutions of inorganic bases. Preferred bases utilized to neutralize the initially formed SAP, when desired, include, but are not limited to, inorganic alkali metal hydroxides, carbonates, bi-carbonates, and mixtures thereof.

Although, based on current studies, any carbohydrate containing a saccharide ring can be utilized, preferred carbohydrates include starch and cellulose, with starch being the most preferred at this time. Certain carbohydrates, such as different forms of cellulose, may require a pretreatment to remove lignin and/or other materials that inhibit the graft polymerization before grafting is carried out.

Preferred monomers have at least some water solubility and include $\alpha,\beta$-unsaturated carboxylic acid derivatives, such as for example acrylic acid, methyl acrylate, acrylamide, methacrylamide, and mixtures thereof. Similar derivatives of maleic acid and itaconic acid can also be utilized. In addition, other esters or amides (amidines) of the $\alpha,\beta$-unsaturated carboxylic acids can similarly be utilized.

Preferred catalysts suitable for a thermal polymerization process should have at least some water solubility and can include, but are not limited to per-compounds such as peroxides, persulfates and the like, and azo compounds. These catalysts are typically activated thermally at some initiation temperature greater than ambient or room temperature. Redox catalysts capable of being activated chemically without heating can also be utilized. Examples of redox catalysts include persulfates coupled with metal cations, hydrogen peroxide, glycolic acid, bisulfites, and other agents.

Cross-linkers are poly-functional, with bi-functional cross-linkers being preferred based on current studies. Suitable functional groups include, but are not limited to $\alpha,\beta$-unsaturated dicarboxylic acid derivatives, epoxides, and combinations thereof. Preferred cross-linking agents should have at least some water solubility. Suitable cross-linking agents can include, but are not limited to N,N'-methylenebis (meth)acrylamide, methylacrylamide, glycidyl methacrylate, lysine, histidine and arginine.

A variety of reactors can be utilized in the thermal process, provided the reactor is capable of: (1) receiving reactants at a temperature below the catalyst's activation temperature; (2) rapidly increasing the temperature of the combined reactants to a temperature above the composition's activation temperature; (3) effecting rapid and nearly instantaneous polymerization to provide a substantially adiabatic polymerization process; and (4) moving the newly formed solid through the additional steps of neutralization and drying, if required. Heat necessary for increasing the reactant temperature above the catalyst's activation temperature can be provided by a variety of means including, but not limited to a heated surface, microwave, infra-red radiation, steam and the like. Preferred continuous reactors include, but are not limited to, a thermal screw reactor, a heated rotating drum reactor and a belt reactor. Suitable reactors can also include stirred or unstirred vessels.

Certain preferred graft copolymers have super absorbent properties and are derived from starch, acrylic acid, acrylamide, and a bifunctional cross-linker. Other preferred graft copolymers are derived from nitrogen-containing carbohydrates including, but not limited to amine-containing carbohydrates. Finally, some preferred graft copolymers are derived from modified carbohydrates. Examples of modified carbohydrates include, but are not limited to oxidized and acid-modified carbohydrates. The novel SAP materials prepared by the method described above can be prepared with a particularly high purity (typically in the range of about 0.1 ppm to 5 ppm of unreacted monomers) and are particularly stable, generally capable of maintaining a gel for more than 24 hours while immersed in excess water. Isolated SAP's can have a flake form, a granular form, an extruded form, or can be pelletized. Graft copolymers prepared according to these methods have typically been obtained in high purity, wherein the copolymer and retained moisture represents at least about 98% of the composition, more preferably at least about 99% of the composition, and more preferably at least about 99.5% of the composition. For the preferred methods and the preferred polymers, conversion of at least about 99% of all of the $\alpha,\beta$-unsaturated carboxylic acid derivatives is achieved. In addition, the preferred SAP's having a specific shape, have demonstrated the ability to retain that shape upon submersion in water for extended periods of time. For example, an SAP particle having a cubic shape, when submersed in water, swells and maintains that cubic shape for at least about 24-48 hours.

Further details with regard to reactants, process details, graft copolymers produced, and preferred reactor systems are provided below.

DETAILED DESCRIPTION

Figure 1:
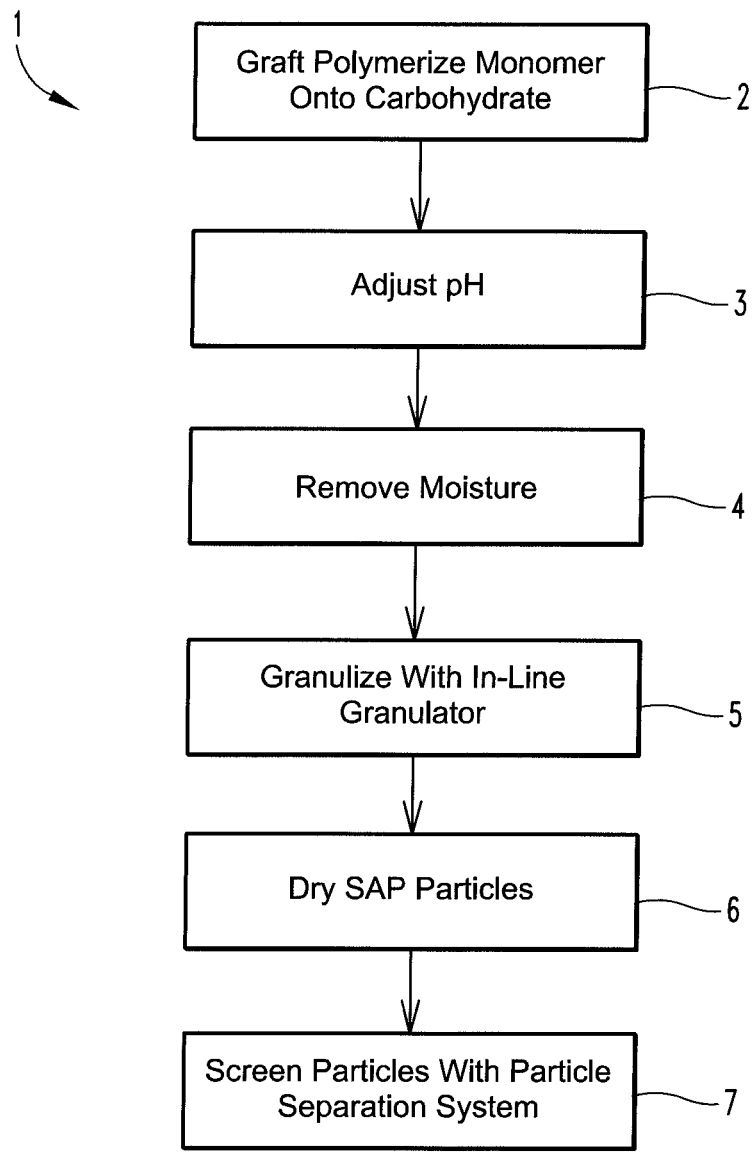
FIG. 1 is a flow diagram illustrating one exemplary embodiment of a method for producing a graft copolymer product.

For the purposes of promoting an understanding of what is claimed, references will now be made to the embodiments illustrated and specific language will be used to describe the same. It will nevertheless be understood that no limitation of scope of what is claimed is thereby intended, such alterations and further modifications and such further applications of the principles thereof as illustrated therein being contemplated as would normally occur to one skilled in the art to which the disclosure relates.

Superabsorbent polymers have proven particularly effective in the agricultural industry, the diaper industry, hygiene related products, and for other applications. Although desirable properties can often be achieved, a high purity SAP that is biodegradable and readily prepared in large volumes at a commercial level starting from a renewable resource has remained elusive.

The present method of making a graft copolymer having superabsorbent properties (an SAP) from a carbohydrate involves (1) graft polymerizing a monomer or monomer combination onto a carbohydrate in the presence of an catalyst to form a carbohydrate graft copolymer, where the polymerization is carried out under substantially adiabatic conditions; (2) optionally, cross-linking the carbohydrate graft copolymer, for example, by adding a cross-linking agent, such as methylene bis-acrylamide to cross-link the carbohydrate graft copolymer; (3) optionally, adjusting the pH of the cross-linked carbohydrate graft copolymer, such as neutralization; (4) isolating the cross-linked carbohydrate graft copolymer; and (5) drying the cross-linked carbohydrate graft copolymer. Although some limited grafting of a carbohydrate can occur without a catalyst under vigorous stirring conditions or upon heating, preferred polymerizations are initiated with a catalyst.

A Substantially Adiabatic Polymerization Process:

A first aspect of the present disclosure involves a polymerization process in which one or more monomers are graft polymerized onto a carbohydrate under substantially adiabatic conditions. In this regard, the term "substantially adiabatic conditions" is meant to include conditions wherein the polymerization is rapid and exothermic and all or substantially all of the heat generated by the polymerization is retained within the polymerization mixture during the period of polymerization. That is, substantially no effort is made to cool the combined reactants within the reaction zone to affect the temperature therein during the period of reacting. As a result, heat from the polymerization is typically generated faster than it can be dissipated to surrounding regions and the temperature of the reaction mixture within the reaction zone reaches substantially that temperature caused by the uncontrolled exotherm of the polymerization reaction. "Reaction zone" is meant to include a region receiving the combination of reactants and forming the graft copolymer therein. Applicant's preferred process can be carried out in a variety of continuous reactor systems, only requires control of the flow rates and initiation temperature and is completed within less than about sixty seconds to less than about 5 minutes after polymerization is initiated.

In contrast an isothermal polymerization process is carried out under conditions and at a rate wherein the heat of polymerization can be removed as quickly as it is generated making it possible to maintain the polymerization system's temperature constant, by heat exchange with the system's surroundings. Typically, an isothermal process is carried out by running a process for a specified period of time at a specified temperature. Depending on the reaction, an isothermal process can be carried out with heating, with cooling or with a combination of intermittent heating and intermittent cooling.

Factors which affect the course of a substantially adiabatic polymerization include, but are not limited to, the choice of monomers, the choice of catalysts, their concentrations, solvent choice (if utilized) and how far the initiation temperature is above the activation temperature. The activation temperature for a particular reaction mixture is the temperature at which polymerization of that mixture will initiate and is a property of that particular reaction mixture. The initiation temperature for a particular process is a temperature at which the reaction mixture is subjected to in order to initiate thermally induced polymerization, and is related to that particular process. The initiation temperature is ≥ the activation temperature.

The graft polymerization process carried out under substantially adiabatic conditions have provided the following advantages: (1) reactions are fast and can be nearly instantaneous; (2) conversion of the monomers is complete, providing a polymer substantially free of residual monomer; (3) polymers are not generally sticky and can be directly moved through production equipment without organic solvents or other processing aids; (4) yields are substantially quantitative providing a product without by-products/impurities; (5) product can be directly isolated without further purification, other than drying; (6) no waste streams or by-product gases are produced other than water vapor; (7) the process can be readily adapted to a continuous process and scaled up to an industrial level; (8) when carried out as a continuous process, the method avoids large volumes containing reactants subject to run-away polymerization; and (9) processes can be carried out in an aqueous medium without flammable solvents.

Reactants, Reagents, and Catalysts:

A further aspect of the present disclosure involves the reactants, reagents, and catalysts utilized for forming a carbohydrate-based polymer and the polymer's desired properties. Because the carbohydrate substrate is typically a major component of the graft polymer, its cost, availability, and susceptibility to graft polymerization are additionally important factors. For these reasons, starch and cellulose are preferred substrates. Starch has proven to be a particularly preferred substrate because of its cost, availability and reactivity and because a range of physical properties can be obtained with its graft copolymers.

Suitable substrates include starches, flours, and meals. More specifically, exemplary starches include native starches (e.g., corn starch (Pure Food Powder, manufactured by A.E. Staley), waxy maize starch (Waxy 7350, manufactured by A.E. Staley), wheat starch (Midsol 50, manufactured by Midwest Grain Products), potato starch (Avebe, manufactured by A.E. Staley)), dextrin starches (e.g., Stadex 9, manufactured by A.E. Staley), dextran starches (e.g., Grade 2P, manufactured by Pharmachem Corp.), corn meal, peeled yucca root, unpeeled yucca root, oat flour, banana flour, and tapioca flour. The starch may be gelatinized to provide optimal absorbency. An exemplary starch is gelatinized cornstarch. Examples of nitrogen-containing and amine-containing carbohydrates utilized in this disclosure are provided and are available from Creative PEGWorks, P.O. Box 16863, Chapel Hill, N.C. 27516, and are highlighted on the company's website: http://www.creativepegworks.com/product_list.php?cid=9&pid=1&sid=107. Other materials described herein were obtained from Santa Cruz Biotechnologies, 10410 Finnell Street Dallas, Tex. 75220 or Sigma-Aldrich, 3050 Spruce Street, St. Louis, Mo.

Suitable monomers for use in the substantially adiabatic process described herein include $\alpha,\beta$-unsaturated carboxylic acid and their derivatives (collectively termed $\alpha,\beta$-unsaturated carboxylic acid derivatives). The $\alpha,\beta$-unsaturated carboxylic acids can include, but are not limited to, acrylic acid, itaconic acid, and maleic acid. Suitable derivatives of the $\alpha,\beta$-unsaturated carboxylic acid can further include, but are not limited to, amides (and amidines), esters, and salts. Preferred $\alpha,\beta$-unsaturated carboxylic acid derivatives include, but are not limited to, acrylic acid, methacrylic acid, acrylamide, methacrylamide, and/or 2-acrylamido-2-methyl-propanesulfonic acid (AMPS). Further derivatives and/or combinations of the above-listed monomers and other non-listed monomers may also be utilized.

To prepare certain graft polymers, it may be desirable to use a single monomer, such as acrylic acid. To prepare other graft polymers, it may be desirable to use a monomer combination such as acrylic acid and acrylamide to be graft polymerized onto a carbohydrate substrate. To prepare still other graft polymers, it may be desirable to use a monomer mixture including an additional monomer such as 2-acrylamido-2-methyl-propanesulfonic acid. For still other graft polymers, particularly SAP's, monomer mixtures it may be desirable to use a monomer combination containing one or more cross-linking agents.

The addition of acrylamide to a monomer mixture containing acrylic acid appears to promote the formation of the resulting graft polymer. By way of example, the preferred ratio by weight of acrylic acid to acrylamide may be about 2:1. Alternatively, the ratio of acrylic acid to acrylamide may also range up to a ratio of 9:1 and beyond. Graft polymers can also be prepared using acrylic acid alone or with other co-monomers, but without acrylamide. The substitution of nitrogen-containing and/or amine-containing carbohydrates for acrylamide has proven a useful alternative to the use of acrylamide, providing graft polymers having the necessary physical properties and adsorption levels without the incorporation of acrylamide.

A cross-linking agent can be added to the mixture to form a cross-linked graft copolymer. It may be desirable for the graft copolymer to be cross-linked to modify the polymer's properties. For example, if the uncross-linked graft copolymer dissolves in aqueous fluids, cross-linking can minimize and/or prevent the polymer's dissolution. Similarly, the graft copolymer's softening point can be increased by cross-linking and by increasing cross-linking levels. Generally, the amount of cross-linking agent added is inversely proportional to the absorbency of the resulting product. Exemplary cross-linking agents include: glycerides; diepoxides; diglycidyls; cyclohexadiamide; methylene bis-acrylamide; methacrylamide, bis-hydroxyalkylamides, such as bis-hydroxypropyl adipamide; formaldehydes, such as urea-formaldehyde and melamine-formaldehyde resins; lysine, histidine, arginine, isocyanates including di- or tri-isocyanates; epoxy resins, typically in the presence of a base catalyst; and derivatives and mixtures thereof. Two preferred cross-linking agents include glycidyl methacrylate and methylene bis-acrylamide.

Catalysts which can be utilized in the substantially adiabatic graft polymerization reactions include catalysts and catalyst systems typically used in free radical polymerizations. Preferred catalysts are thermally activated and have at least some water solubility. Particularly preferred catalysts include peroxides, including hydrogen peroxide, t-butyl peroxide, and acetyl peroxide; persulfates, including, but not limited to, ammonium and alkali metal persulfates; and azo compounds, including, but not limited to, 2,2'-azobis(2-amidinopropane)-dihydrochloride. Catalysts that can be activated at ambient temperatures, such as redox catalyst systems, can also be utilized. For example, ammonium or potassium persulfate can be coupled with hydrogen peroxide, iron salts, glycolic acid bisulfites and other components to provide a catalyst system capable of initiating polymerization at ambient temperatures below the catalyst's decomposition temperature.

Alternative methods of initiating polymerization and cross-linking may also be employed. For example, a solid SAP product may be cross-linked through irradiation, such as exposure to gamma or x-ray electromagnetic radiation, or to an electron beam and the like. Irradiation facilitates cross-linking of the graft copolymer by creating free radicals in the copolymer chain. In some applications, after irradiation an annealing or melting process may be used in re-forming the cross-linked copolymer chains. Furthermore, it may be desirable to perform the irradiation process in an atmosphere relatively free of oxygen.

Process Embodiments

FIG. 1 is a flow diagram illustrating one exemplary embodiment of a method 1 for producing a graft copolymer derived from an α,β-unsaturated carboxylic acid derivative and a carbohydrate as described herein, under substantially adiabatic conditions. When the method selected utilizes starch, SAP's can be produced having particularly high purities and high absorbencies. Further variations of the illustrated process can be carried out by one skilled in the art utilizing the reactants and catalysts described above according to the following reaction methods. According to the current disclosure, the reactants and a catalyst or catalyst component are initially combined in a manner to avoid initiation conditions.

For a thermally initiated polymerization, the initiation conditions generally include the temperature greater than the activation temperature at which polymerization is abruptly initiated causing polymerization to rapidly proceed in an exothermic manner. The properties of the resulting graft polymer and the rate of polymerization are both affected by how much the initiation temperature exceeds the activation temperature. Based on studies carried out thus far, superior properties, including color and absorbance of starch derived copolymers, have been obtained when the initiation temperature is in the order of about 10 to about 15 degrees Fahrenheit above the activation temperature. The activation temperature can be affected by a variety of factors including, but not limited to, the reactivity of the monomer(s), the decomposition temperature of the catalyst, monomer and catalyst concentrations, solvent, the presence of polymerization inhibitors in the monomer(s), and the presence or absence of oxygen. Optimization of a specific polymerization through modifications of these variables can readily be carried out by one skilled in the art of forming graft copolymers.

To carry out a chemically induced graft polymerization, the reactants and a first catalyst component are combined at a temperature below the thermally induced activation temperature. The second catalyst component is combined and thoroughly mixed with the reactants, including the first catalyst component, to create initiation conditions and abruptly initiate polymerization. The initiated polymerization is then conducted under substantially adiabatic conditions. A further embodiment of the process can be carried out by providing a catalyst having an activated temperature, combining all or a portion of the reactants to form a combination without the catalyst, causing the combination's temperature to equal or exceed the catalyst's activation temperature, and introducing the catalyst (and any remaining reactants) to the combination to initiate a substantially adiabatic polymerization. The rate of chemically induced polymerization can affect the resulting polymer's properties and can be affected by the temperature at which polymerization is initiated and the amount of each of the catalyst components. Depending on the temperature at which the chemically induced polymerization is initiated and the exothermic nature of the polymerization process, and the catalyst system selected, a chemically induced polymerization can additionally become thermally induced in a later stage if the polymerization mixture's temperature rises above the system's activation temperature. More specifically, thermal activation can occur if the polymerization mixture has an activation temperature and the exothermic nature of the polymerization causes mixture's temperature to exceed its activation temperature. Persulfates are examples of a catalyst or catalyst component capable of thermal activation or chemical activation upon combination with a second catalyst component. The manner in which the two catalyst components become components of a reactant combination is generally not important, e.g. catalyst components 1 and 2 can be reversed.

The Polymer:

Once the graft copolymer is formed, its pH may be adjusted to a desired value for the particular application by the addition of a base. For example, the cross-linked graft copolymer can be neutralized to convert the carboxyl groups to a salt, affecting the neutralized polymer's properties. Alternative pH values obtained with alternative bases may be desirable depending upon the polymer's use. For SAP applications, involving human contact, safety and suitable contact properties may control. For agricultural applications, potassium and/or ammonium salts may be beneficial and the choice of salt may depend on the type of soil and the type of crop to be grown. The desirable pH for most agricultural applications typically will range from about 6.0 to about 8.0. The desired pH may be greater or less than this range depending on the requirements for the particular agricultural application. For some embodiments, a pH adjustment may not be necessary. For example, if the acid form of the polymer provides desired properties or if the graft copolymer was prepared with a salt of the α,β-unsaturated carboxylic acid, a pH adjustment may not be necessary.

The resulting pH adjusted, graft copolymer produced by the processes described herein can then be directly isolated with or without some preliminary drying. One exemplary method of isolation involves preliminary drying within the reactor system, removal from the reactor system, followed by further drying and processing as necessary. The dried graft copolymer can then be pelletized, if desired, according to pelletization methods known to those having skill in the art. The graft copolymers prepared according to the present disclosure can be directly isolated without the use of methanol, other lower alcohols, and/or other processing aids.

Compared to alternative methods (described in the Background section) for producing graft copolymers, such as SAP's, which require a saponification step, the method described herein can directly provide a pH-adjusted, graft copolymer reaction mass (cross-linked or non-cross-linked)

having no extraneous salt, without the evolution of ammonia. Additionally, the resulting graft copolymer is not sticky, but is flowable, making it possible to maintain a completely aqueous system, avoid utilizing a dusting agent to prevent sticking, and avoid contamination with an alcohol. The use of methanol or similar alcohols can add significantly to the cost of producing an SAP, because the recovery and disposal of methanol (an related lower alcohols) can be expensive. In addition to costs, the use of an alcohol introduces safety and environmental issues. The use of a dusting agent adds processing and material costs, and provides a graft copolymer additionally containing the dusting agent. The present disclosure provides methods which avoid these disadvantages.

Figure 5:
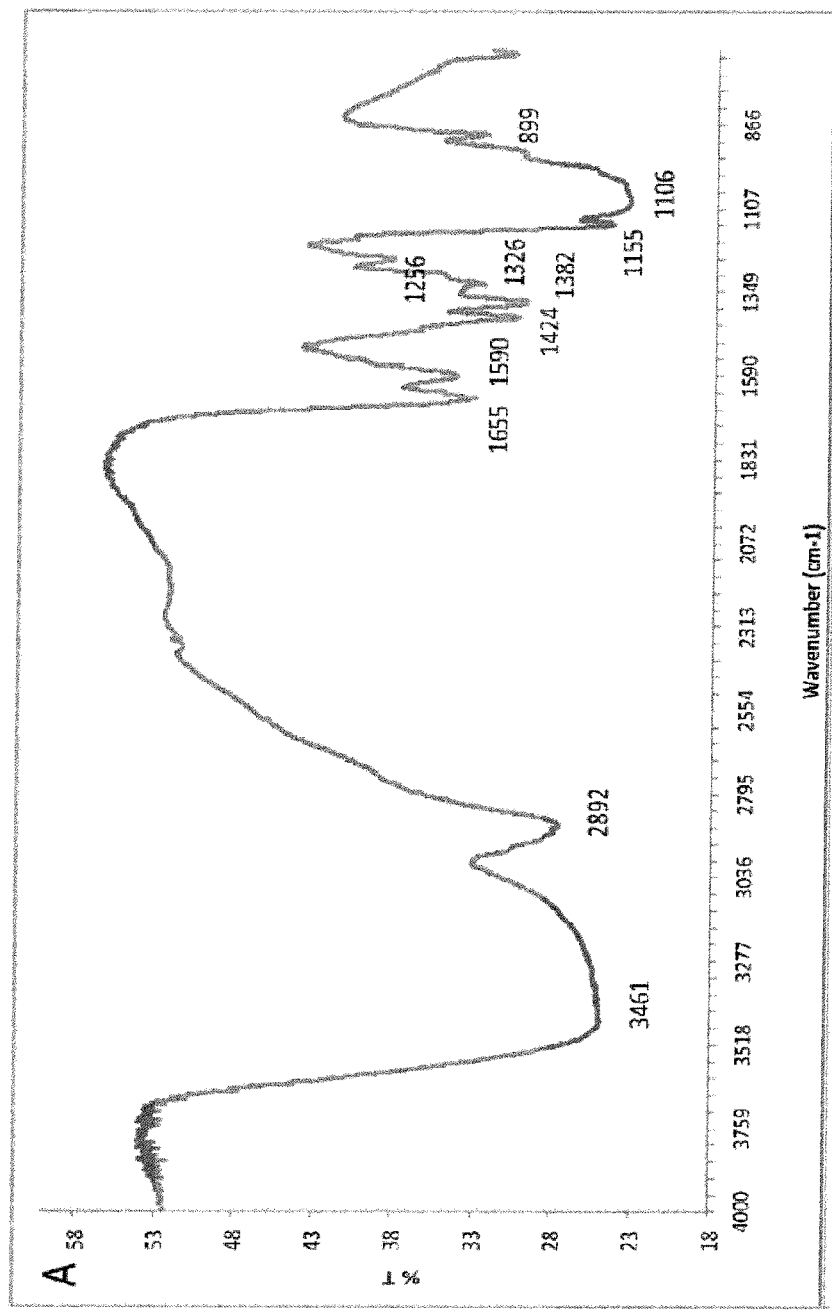
FIG. 5 is an FTIR spectrum of chitosan flakes.
Figure 6:
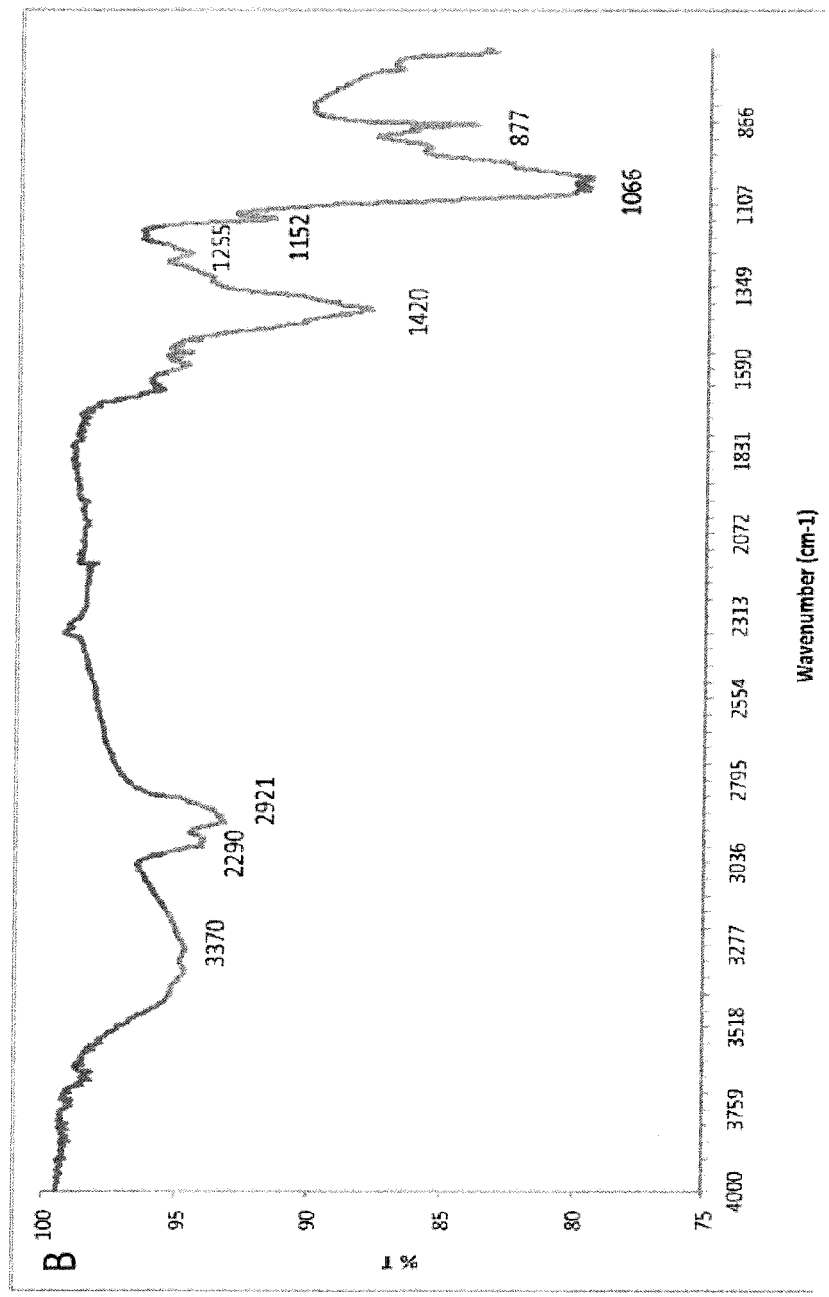
FIG. 6 is an FTIR-ATR spectrum of chitosan flakes.
Figure 7:
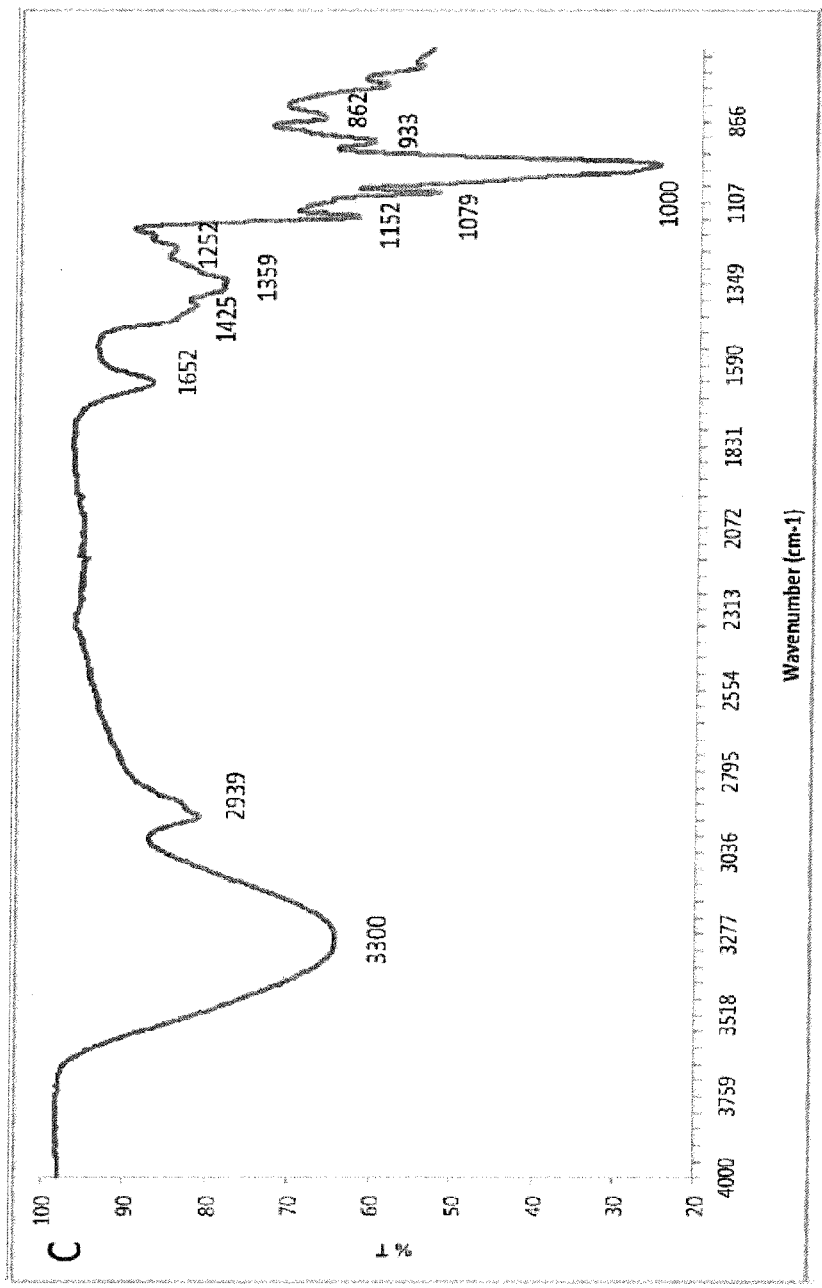
FIG. 7 is an FTIR-ATR spectrum of corn starch.
Figure 8:
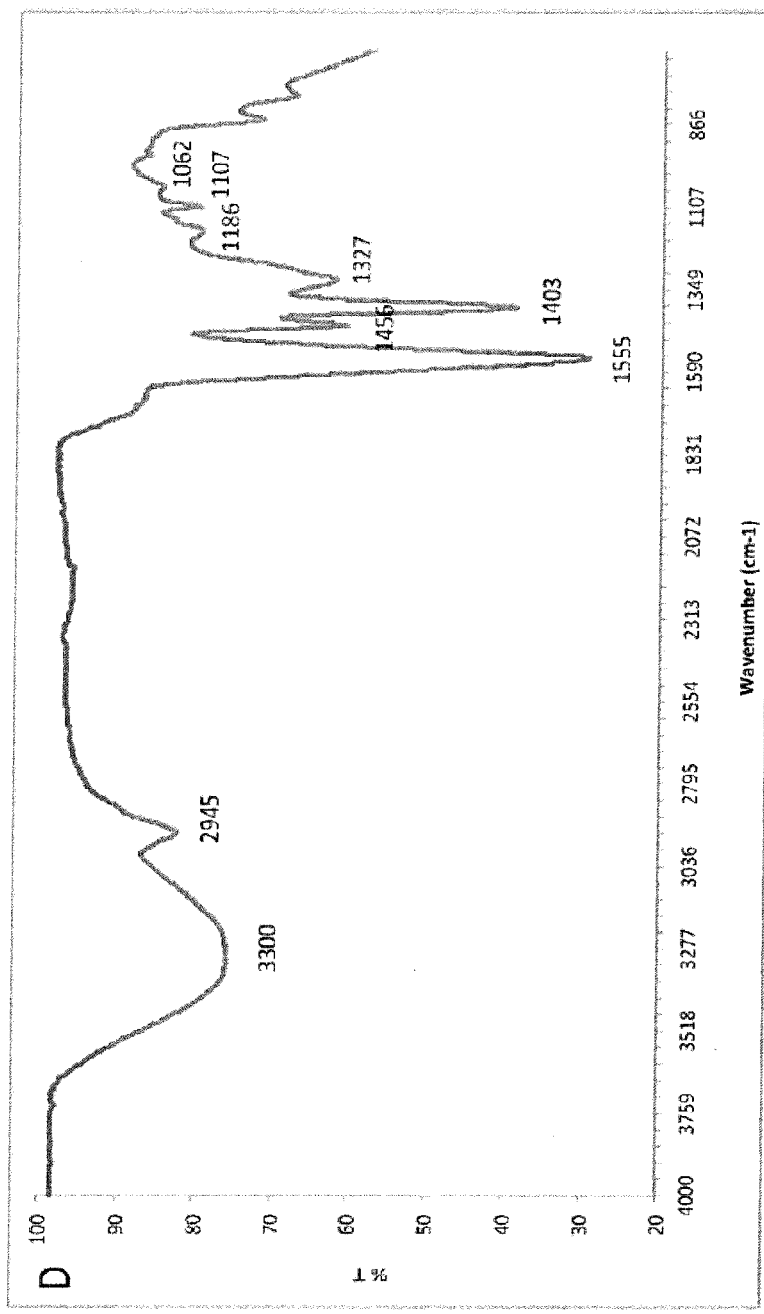
FIG. 8 is an FTIR-ATR spectrum of sodium polyacrylate.
Figure 9:
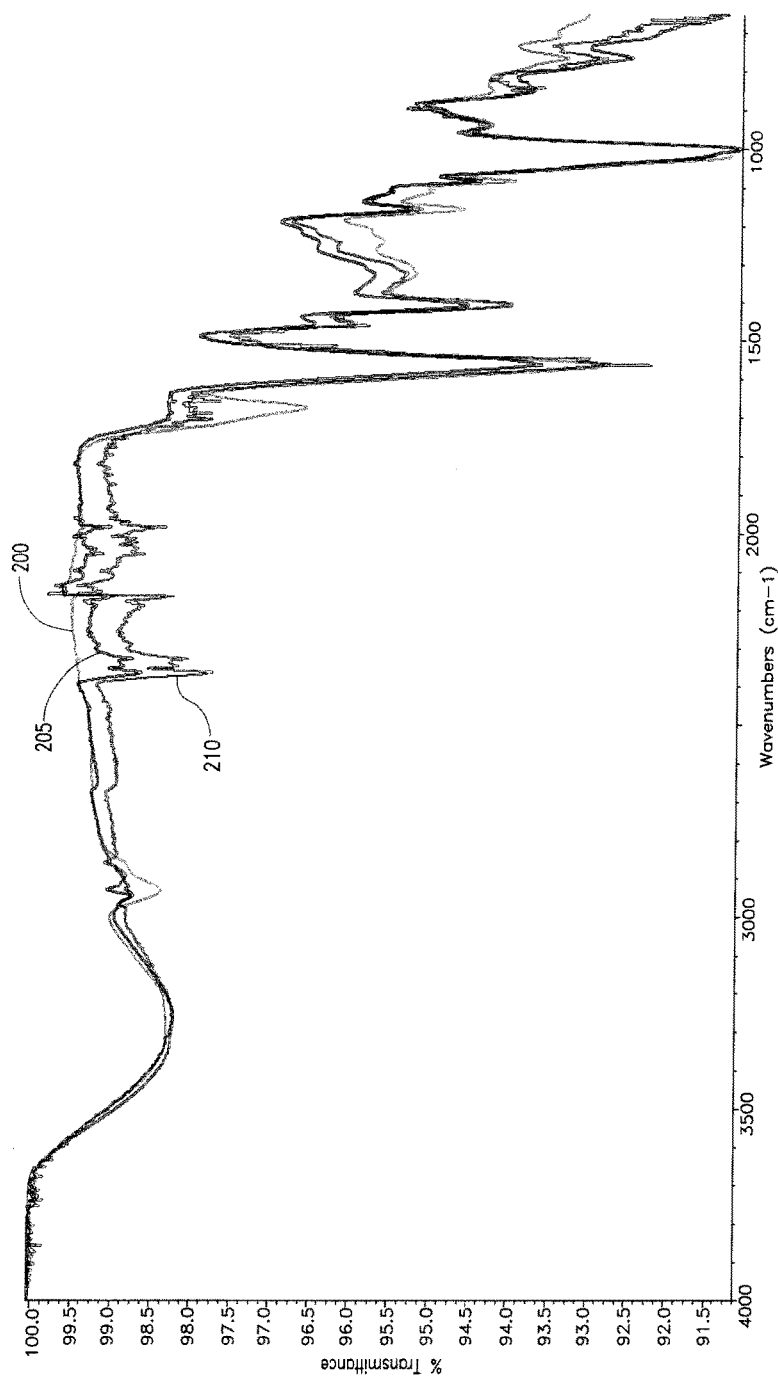
FIG. 9 includes a comparison of FTIR-ATR spectra of polymers including varying amounts of chitosan, oxidized, unoxidized, and a combination thereof.

Polymers prepared utilizing modified carbohydrates and amine-substituted carbohydrates can be identified by observing adsorptions characteristic of a component in the polymer's FTIR spectra. FIG. 5 illustrates the FTIR spectra for chitosan flakes. FIG. 6 illustrated the FTIR-ATR spectra of chitosan flakes illustrating the advantage of the FTIR-ATR technique. FIG. 7 is an FTIR-ATR spectra of corn starch, and FIG. 8 is an FTIR-ATR spectra of sodium polyacrylate. FIG. 9 provides a comparison of the FTIR-ATR spectra of polymers containing varying amounts of oxidized chitosan and unoxidized chitosan.

Reactor Options:

The following disclosure is provided to illustrate examples of reactors in which the substantially adiabatic graft polymerization can be conducted, and is not intended to limit the breadth of the present disclosure, nor limit the disclosed process to being carried out within a particular reactor. The reactors illustrated include, a thermal screw (FIG. 2), a heated drum reactor (FIG. 3), and a belt reactor system (FIG. 4).

Figure 2:
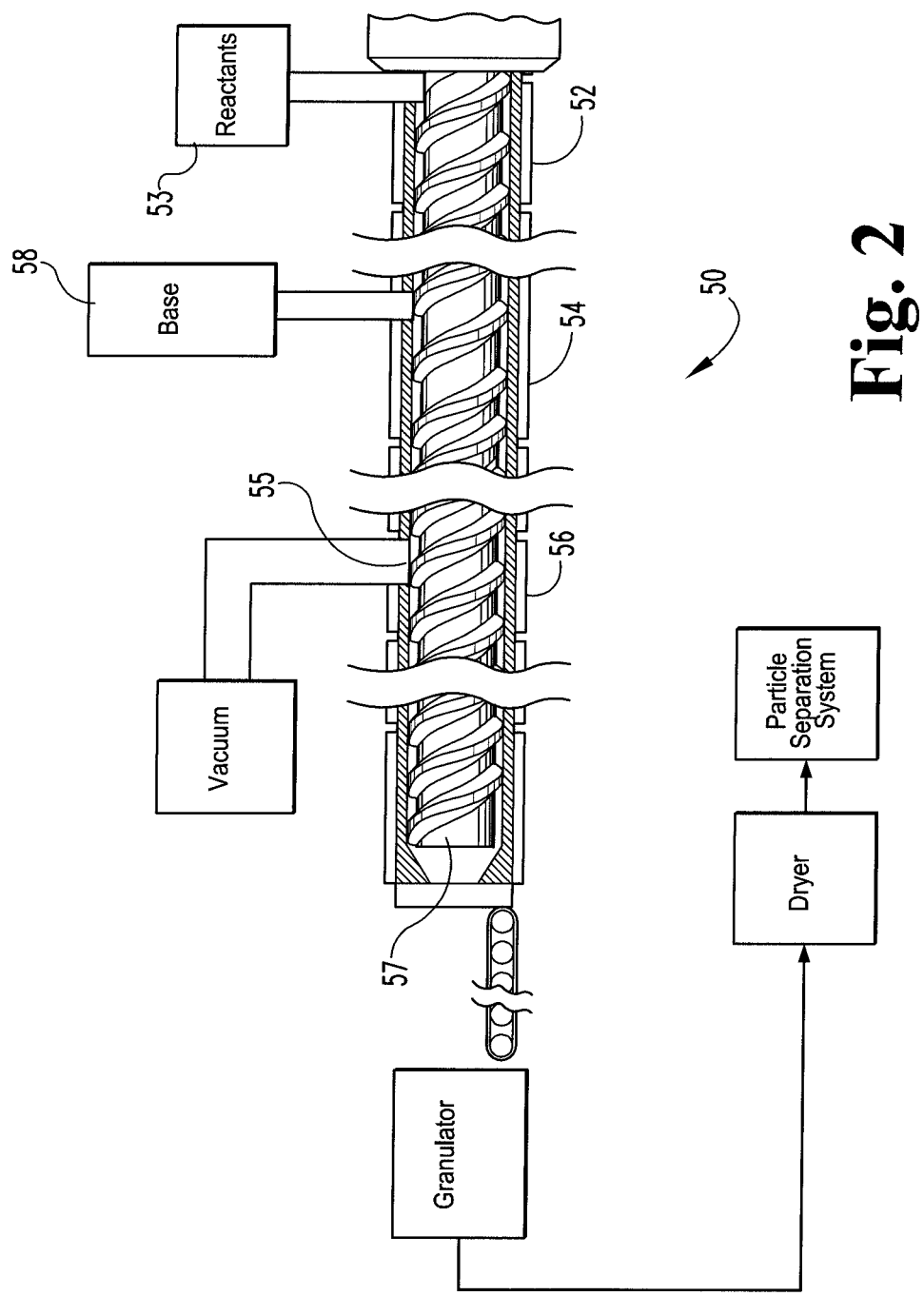
FIG. 2 is a partially cut away side elevation cross sectional view combined with a block view of one embodiment of a thermal screw reactor system suitable for the manufacture of graft copolymers of carbohydrates.

FIG. 2 illustrates a thermal screw reactor system 50 suitable for conducting a substantially adiabatic graft polymerization. A dual thermal screw (not illustrated) is preferred because of its inherent cleaning ability. The system includes reactant source 53 capable of delivering an appropriate reaction mixture into the polymerization region 52 which is maintained at an initiation temperature to abruptly initiate polymerization as the reactants are introduced. The reactant source 53 can be a vessel designed to maintain the reactants at a temperature below at least the initiation and activation temperatures or a mixing device such as a static mixer through which streams of reactants pass through on the way to the polymerization region 52. The solids which form in polymerization region 52 are moved in the direction of neutralization region 54 by the extrusion screw 57, where base can be introduced into system 50 from base reservoir 58. The neutralized solids from neutralization region 54 are further moved into the drying region 56 by extrusion screw 57, where moisture is removed through vent 55 which is connected to a vacuum source. By adjusting the time polymer spends in drying region 56, the temperature therein, and the level of the vacuum maintained therein, a desired level of drying of the polymer exiting drying region 56 can be obtained. The solid exiting the reactor system 50, can, if desired, be dried further, granulated, and sized.

Figure 3:
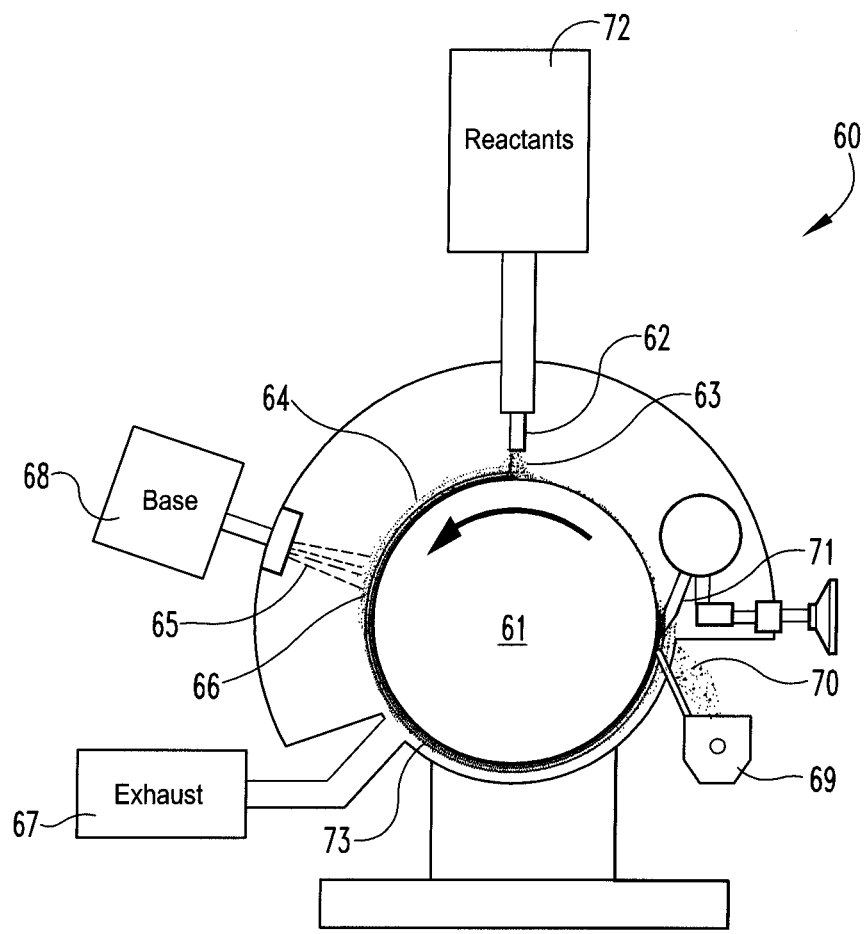
FIG. 3 is a side elevation view combined with a block view of one embodiment of a heated drum reactor system suitable for the manufacture of graft copolymers of carbohydrates.

FIG. 3 illustrates a heated drum reactor polymerization system 60. Reactants 63, including the carbohydrate, monomer(s), and catalyst can be delivered from reactant source 72, through a delivery system 62 onto the polymerization region 64 of heated drum 61, where polymerization abruptly commences forming a graft copolymer. The reactant source 72 can be a reservoir containing the combined reactants or a mixing device (e.g. a static mixer) through which the reactants are passed to effect their combination and mixing. The surface of the heated drum reactor 61 is maintained at an initiation temperature sufficient to abruptly initiate a substantially adiabatic polymerization. As the heated drum 61 turns, the newly formed polymer passes through the neutralization region 66 where the polymer is contacted with a base 65 delivered from a neutralization base source 68. As the heated drum 61 continues to turn the neutralized polymer enters drying region 73 where moisture is removed from the solid. An exhaust 67 can be utilized to move air over the moist polymer to facilitate drying. As the heated drum continues to turn the dried or partially dried solid reaches a knife 71 positioned to remove substantially all of the solid 70 adhering to heated drum 61 causing the solid to collect in hopper 69. Hopper 69 can be replaced with a conveyer belt (not shown) or other collection mechanism to facilitate removal of the solid.

Figure 4:
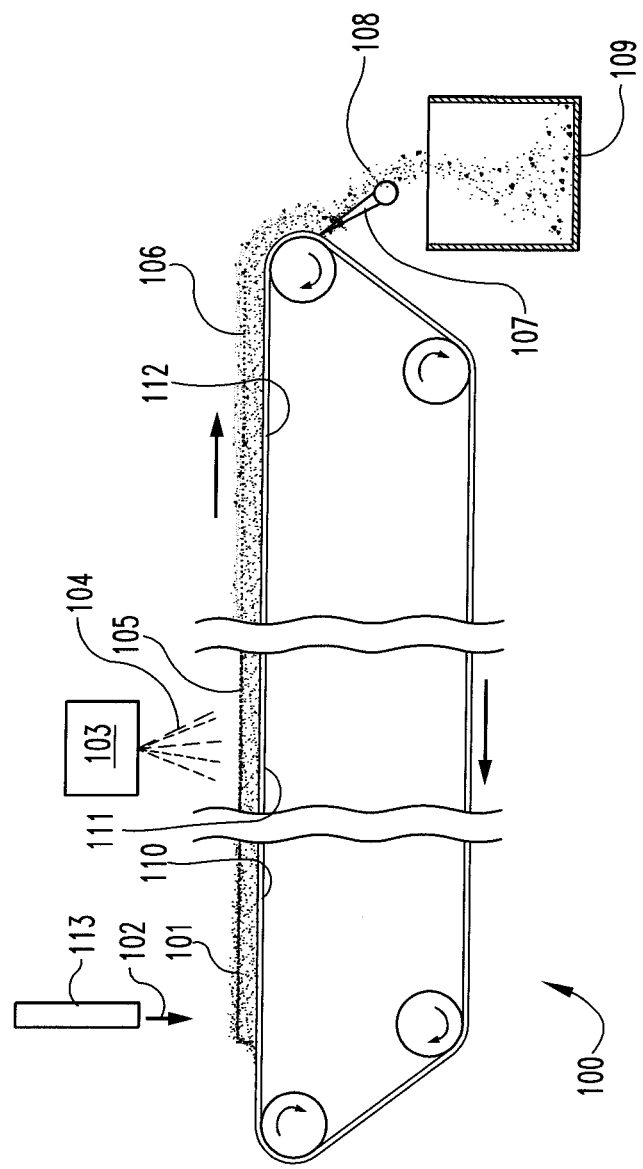
FIG. 4 is a partially cut away side elevation cross sectional view combined with a block view of one embodiment of a belt reactor system suitable for the manufacture of graft copolymers of carbohydrates.

FIG. 4 illustrates a belt reactor system 100, suitable for the substantially adiabatic graft polymerization process. Reactants 102 can be delivered from reactant source 113 onto the polymerization region 110 of the heated belt maintained at the initiation temperature to cause the abrupt formation of solid polymer 101. The initiation temperature can be maintained by heating the belt's surface directly, by infrared radiation, by microwave radiation or any other conventional means. The polymer formed is moved with the belt from the polymerization region 110 into the neutralization region 111 where base 104 can be added from the neutralization source 103 to form neutralized polymer 105. Further movement of the heated belt causes the neutralized polymer 105 to move into the drying region 112 where moisture is removed through evaporation. Removal of water can be facilitated by movement of air across the wet solid, additional warming or any other conventional drying means. As the dried or partially dried solid 106 moves from the drying region 112, contact with knife 107 causes polymer 108 to be removed from the belt and collect in container 109. Container 109 can be replaced with a conveyer belt or other automated means to facilitate collection of the polymer formed. A suitable belt reactor can also be capable of receiving droplets of the combination, affecting polymerization and providing polymer in the form of pastels.

The proper positioning of elements associated with the thermal screw reactor 50, heated drum reactor 60, and the belt reactor 100 to allow for a specific graft co-polymerization, neutralization, and drying can be readily determined by one skilled in the art. The positions provided for the various elements in FIG. 2, FIG. 3 and FIG. 4 are provided only for illustrative purposes and are not intended to be taken as optimized positions. Furthermore, the examples of reactors provided herein are for illustrative purposes and the examples are not intended to otherwise limit any claimed processes to a particular reactor unless such limitation is explicit.

EXAMPLES

The examples which directly follow (Examples 1-28), describe graft polymerizations of the specified carbohydrates with acrylic acid with and without acrylamide, with and without cross-linking agents carried out under substantially adiabatic conditions. The reaction mixtures were formed either by (1) forming the combinations (a) water and acrylic acid and (b) starch, acrylamide, cross-linking agent and catalyst; and mixing the two combinations; or (2) by forming the combinations water and starch and adding the remaining components with agitation. The water starch mixtures were typically stirred for 1-2 hours until uniform, before the grafting operation. On an industrial level, preparation of the water starch mixtures can be facilitated by use of a jet cooker utilizing steam injection. Examples are provided of graft polymerizations carried out in a stainless steel tube, on a heated metal surface (heated skillet), in a container suspended in a water bath and in a microwave oven. Monomer content and absorbance was measured for the polymers formed. Procedures for adapting these methods to continuous reactors including a thermal screw, a heated drum reactor and a belt reactor are also provided. Examples are also provided of substantially adiabatic polymerizations which can be carried out in a heated thermal screw, on a heated drum reactor and on a belt reactor.

sample obtained from the early runs utilizing an unstirred tube reactor. A tube reactor containing an augur or similar stirring mechanism can improve agitation of the reaction mixture, facilitate heat transfer to achieve initiation temperature, and further movement of the resulting solid through the tube. Better mixing and heat transfer can further reduce any trace amounts of acrylic acid remaining in the solid. Similar graft polymerizations can be carried out with other carbohydrates and $\alpha,\beta$-unsaturated carboxylic acid derivatives described herein.

TABLE I

| Reaction Variables | Examples | | | | | | | |
|---|---|---|---|---|---|---|---|---|
| | 1 | 2 | 3 | 4 | 5 | 6 | 7 | 8 |
| Water(g) | 1000 | 1000 | 1000 | 1000 | 1000 | 1000 | 1000 | 1000 |
| Starch(g) | 100 | 100 | 100 | 100 | 100 | 100 | 100 | 100 |
| Acrylic Acid(g) | 100 | 100 | 100 | 100 | 100 | 100 | 131.25 | 131.25 |
| Acrylamide(g) | 50 | 50 | 50 | 37.5 | 25 | 50 | 25 | 25 |
| Glycidyl Methacrylate(g) | 0.5 | 0.5 | 0.5 | 0.5 | 0.5 | 0.5 | 0.25 | 0.25 |
| Ammonium Persulfate(g) | 0.5 | 0.5 | 0.5 | 0.5 | 0.5 | 0.5 | 0.5 | 0.5 |
| Initiation Temperature(° F.) | 180 | 225 | 180 | 180 | 180 | 180 | 160 | 210 |
| Neutralization Base | — | — | KOH | KOH | KOH | — | KOH | KOH |
| Absorbance | — | — | 311 | 120 | 151 | — | 151 | 285 |

The graft copolymers' absorbances (water) were determined by drying a copolymer sample, determining the dried sample's moisture content, weighing a 0.5 g sample, adding approximately 700 mL of water, and after about four (4) hours pouring the mixture into a 325 sieve screen to remove excess water. Residual surface water was removed by gently blotting and the fully hydrated sample was weighed. The difference between a sample's hydrated weight and its dry weight, corrected for any moisture retained by the dry sample was determined and utilized to determine the sample's absorbance.

Examples 1-8

Aqueous reaction mixtures containing starch, acrylic acid, acrylamide, cross-linking agent, and catalyst were prepared. A reaction mixture was added to a stainless steel tube heated to the initiation temperature to initiate polymerization and the initiated polymerization was conducted under substantially adiabatic conditions within the steel tube. Heating was provided with a heating mantel or with a water bath. Use of the water bath provided more accurate temperature control. Polymers were formed in quantitative yields. Selected polymers were neutralized with aqueous potassium hydroxide and their absorbance determined. Table I provides the details for reactions 1 through 8. Each polymerization was completed to provide a solid within less than about 5 minutes, with some polymerizations being completed within less than about 1 minute. A lack of agitation within the stainless steel tube resulted in a slight retardation of polymerization within the center of the tube. In addition, the reactions carried out at the higher temperature have shown some discoloration due to overheating if the polymer is exposed to the higher temperatures for longer than necessary amounts of time. Although the polymer samples obtained were generally free of any acrylic acid odor, some slight acrylic acid odor could be detected from the head space above one stored polymer Example 9

A reaction mixture was prepared containing 1000 g of water, 100 g of starch, 100 g of acrylic acid, 50 g of acrylamide, 0.5 g of glycidyl methacrylate, and 0.5 g of ammonium persulfate. A portion of the reaction mixture (about ⅓) was placed in a microwave oven and heated on high to quickly achieve initiation temperature (about 30 seconds), at which time the microwave oven was shut off. The solid formed was neutralized with KOH and its absorbance determined to be 111. No residual acrylic acid was detected by smell nor was an iodine solution decolorized by contact with the polymer obtained.

Example 10

A reaction mixture was prepared containing 1000 g of water, 100 g of starch, 125 g of acrylic acid, 25 g of acrylamide, 0.5 g of glycidyl methacrylate, and 0.25 g of ammonium persulfate. A portion of the reaction mixture having an initial temperature of about 145° F. was poured onto a metal skillet heated in a water bath maintained at about 180° F. The polymer that quickly formed was cooled and neutralized with potassium hydroxide and its absorbance determined to be 360. No residual acrylic acid could be detected. Similar results were obtained by adding a similar polymerization mixture onto an electric grill preheated to about 375° F., although the polymerization occurred much faster.

Examples 11-17

Aqueous reaction mixtures containing starch, acrylic acid, acrylamide, cross-linking agent (glycidyl methacrylate), and catalyst were prepared. Example 15 additionally contained 2-acrylamido-2-methyl-propanesulfonic acid (AMPS) in the amount noted. The reactants were placed in a container positioned within a water bath maintained at an initiation temperature. Upon reaching and exceeding the activation temperature, polymerization initiated causing a temperature increase and forming solid. No residual acrylic acid remained in the polymers as evidenced by lack of odor and the iodine test described above. Polymer yields were substantially quantitative. Portions of the polymer were neutralized with either potassium hydroxide or sodium bicarbonate, and selected samples (13 and 14) were additionally rinsed with an isopropyl alcohol and dried before conducting tests to determine the polymer's absorbance. This method can also be utilized to prepare graft polymers without a cross-linking agent. The isopropyl alcohol rinse was carried out solely to determine possible effects on the polymer's absorbance. Results are summarized in Table II below.

TABLE II

| Reaction Variables | Examples | | | | | | |
|---|---|---|---|---|---|---|---|
| | 11 | 12 | 13 | 14 | 15 | 16 | 17 |
| Water(g) | 1000 | 1000 | 1000 | 1000 | 1000 | 1000 | 1000 |
| Starch(g) | 100 | 100 | 112 | 112 | 112 | 112 | 100 |
| Acrylic Acid(g) | 125 | 131.25 | 125 | 125 | 125 | 125 | 125 |
| Acrylamide(g) | 25 | 25 | 25 | 25 | 25 | 15 | — |
| Glycidyl Methacrylate(g) | 0.25 | 0.25 | 0.25 | 0.25 | 0.20 | 0.20 | 0.1 |
| Ammonium Persulfate(g) | 0.5 | 0.5 | 0.5 | 0.5 | 0.75 | 1.25 | 1.25 |
| AMPS(g) | — | — | — | — | 80.04 | — | — |
| Initiation Temperature(° F.) | 192 | 200 | 187 | 185 | 185 | 185 | 201 |
| Absorbance (KOH) | 511 | 534 | 222 | 210 | 249 | 193 | 204 |
| Absorbance (NaHCO$_3$) | — | — | — | — | 200 | 215 | — |
| Absorbance (IsoPrOH Treatment) | — | — | 348 | 283 | — | — | — |

Examples 18-22

Aqueous reaction mixtures containing starch, acrylic acid, acrylamide, cross-linking agent (methylene bis-acrylamide), and catalyst (ammonium persulfate) were prepared. The reactants were placed in a container positioned within a water bath maintained at an initiation temperature. Upon reaching the activation temperature, polymerization initiated causing a temperature increase and forming solid. No residual acrylic acid remained in the polymers as evidenced by lack of odor and the iodine test described above. Polymer yields were substantially quantitative. Portions of the polymer were neutralized with potassium hydroxide, sodium bicarbonate or potassium carbonate before conducting tests to determine the polymer's absorbance. Results are summarized in Table III below.

TABLE III

| Reaction Variables | Examples | | | | |
|---|---|---|---|---|---|
| | 18 | 19 | 20 | 21 | 22 |
| Water(g) | 1000 | 1000 | 1000 | 1000 | 1000 |
| Starch(g) | 100 | 100 | 100 | 100 | 100 |
| Acrylic Acid(g) | 125 | 125 | 125 | 135 | 145 |
| Acrylamide(g) | 30 | 25 | 35 | 68 | 72 |
| Methylene bis-Acrylamide(g) | 0.1 | 0.25 | 0.25 | 0.25 | 0.25 |
| Ammonium Persulfate(g) | 1.25 | 0.5 | 0.75 | 1.0 | 1.0 |
| Initiation Temperature(° F.) | 177 | 168 | 187 | 185 | 185 |
| Absorbance (KOH) | — | 188 | 153 | 166 | — |
| Absorbance (NaHCO$_3$) | 204 | 226 | 172 | — | — |
| Absorbance (K$_2$CO$_3$) | — | — | — | 174 | 160 |

Example 23

A graft polymerization is carried out within a twin thermal screw reactor. A suitable reactor can be a single screw reactor or a twin screw reactor and can vary in size and configurations. For the purpose of illustration a reactor has been chosen having a diameter of about 24 inches and measuring about 20 feet in length. The twin thermal screw is fitted with accessories as illustrated in FIG. 2 illustrating a single screw reactor. The designations of regions and accessories utilized in FIG. 2 are utilized in this example. The reactor is fitted with a reactant source 53, a neutralization source 58, and a vent to a vacuum source 55 as illustrated. During the polymerization reaction described below, the twin-screws are operated at a rate of about 2.25 feet/minute and the polymerization region 52 is heated to at least about 165° F. to about 180° F. The polymerization region 52 is about 2 feet to about 4 feet in length, the neutralization region 54 is about 1 foot to about 2 feet in length, and the drying region 56 is about 14 feet to about 17 feet in length.

A polymerization reaction mixture containing 10,000 kg of water, 1,120 kg of starch, 1,250 kg of acrylic acid, 350 kg of acrylamide, 2.5 kg of methylene bis-acrylamide, and 7.5 kg of ammonium persulfate is delivered through reactant source 53 at a rate of about 20 gallons per minute into the thermal screw's polymerization region 52. Once within the twin thermal screw, polymerization is initiated and completed within about 1 to 4 minutes. As the thermal screw moves the wet solid from the polymerization region 52 into the neutralization region 54, sufficient dilute aqueous potassium hydroxide is delivered into the twin screw from the neutralization source 58 to mix and neutralize the polymer's carboxyl groups and provide a pH of about 7.5. As the twin screw continues forward, the neutralized solid moves into the drying region 56 where the wet polymer is subjected to reduced pressure with continued heating to facilitate drying. The desired level of drying can be effected by varying the length of the drying region, the varying the vacuum applied to vent 55, varying the rate screws 57 rotate, and by increasing the temperature of drying region 56. The flowable solid exiting the twin screw reactor can be directly dried further, if desired, granulated, and/or sized for a specific application without any further purification or work-up. Operating in this manner, the twin thermal screw reactor 50 can produce approximately 21 million pounds of copolymer within about 300 days of operation.

Example 24

A graft polymerization is carried out on a heated drum reactor 60 (FIG. 3). The reactor can vary in size and configurations, but for the purpose of illustration a reactor has been chosen having a heated drum that measures about 4 feet by about 9 feet to provide a usable surface area of about 91 ft² and a circumference of about 10 linear ft. The reactor is fitted with a reactant source 72, a neutralization source 68, a reactor exhaust 67 and knife/scraper device 71 as illustrated in FIG. 3. During operation, the drum rotates counterclockwise at a rate of about one complete rotation every 8-9 minutes.

The polymerization reaction mixture containing 1000 kg of water, 112 kg of starch, 125 kg of acrylic acid, 25 kg of acrylamide, 0.25 kg of glycidyl methacrylate, and 0.5 kg of ammonium sulfate is heated to about 150° F. and passed from reactant source 72 onto the polymerization region 74 of the heated drum at a rate of about 0.9 gallons per minute. The heated drum's surface is maintained at a temperature of from about 170° F. to about 200° F. Polymer is formed within less than about 30-45 seconds, coating the drum with solid. As the drum move in the direction of the neutralization source 68, sufficient dilute aqueous potassium hydroxide is sprayed across the coated drum's surface from the neutralization base source 68 to neutralize the polymer's carboxyl groups, and provide a pH of about 7.5. As the drum containing neutralized polymer continues to rotate, the wet polymer passes through drying region 73 where air is passed over the warm polymer to facilitate drying. As the drum continues to rotate, the dried or partially dried polymer contacts the knife/scraper 71 which removes the polymer from the drum causing it to fall into hopper 69. The resulting free-flowing polymer can be used as collected, or further dried without any additional purification steps or work-up. Additionally, the physical form of the copolymer formed can be changed to suit a particular application.

Operating in this manner, the heated drum reactor 60 can produce about 2.6 pounds of finished product/minute and running at 80% operating time, produce about 1.1 million pounds of copolymer a year.

Example 25

A graft polymerization is carried out on a belt reactor 100 (FIG. 4). The reactor can vary in size and configurations, but for the purpose of illustration a reactor has been chosen that measures about 4 feet wide by about 30 feet long to provide a working upper surface area of about 120 ft². The reactor is fitted with a reactant source 113, a neutralization 103, and knife/scraper device 107 as illustrated in FIG. 4. During operation, the belt rotates clockwise at a rate of about 3 feet/minute. The belt's polymerization region can be heated by the various methods known for heating a region of a belt reactor including a microwave source (not shown). The reactor can be fitted with rollers (not shown) to level the reaction mass if necessary.

A polymerization reaction mixture containing 1000 kg of water, 112 kg of starch, 125 kg of acrylic acid, 25 kg of acrylamide, 0.25 kg of glycidyl methacrylate, and 0.5 kg of ammonium sulfate is heated to about 150° F. and passed from reactant source 113 onto the polymerization region 110 of the belt at a rate of about 3 to 4 gallons per minute, with the belt moving forward at a rate of about 3 feet/minute. The polymerization region 110 is heated and maintained at a temperature of from about 165° F. to about 180° F. Polymer is formed within less than about 1 to 2 minutes coating the belt with solid. As the belt moves in the direction of the neutralization source 103, sufficient dilute aqueous potassium hydroxide is sprayed across the coated belt's surface from the neutralization base source 103 to neutralize the polymer's carboxyl groups, and provide a pH of about 7.5. As the belt carrying neutralized polymer continues to advance, the wet polymer passes through drying region 112. The drying region 112 can be maintained at elevated temperatures with additional warming and a flow of air can be passed over the warm polymer to facilitate drying. As the belt continues to advance, the polymer contacts the knife/scraper 107 which removes the polymer from the belt causing it to fall into a polymer collector 109. The resulting free-flowing polymer can be used as collected, or further dried without any additional purification steps or work-up. Additionally, the physical form of the copolymer formed can be changed to suit a particular application. Operating in this manner, the belt reactor 100 can produce about 10.8 pounds of finished product/minute and running at 80% operating time, produce about 4.5 million pounds of copolymer a year.

Example 26

The twin-thermal screw reactor utilized in Example 23, additionally fitted with a second reactant delivery system can be utilized to prepare a graft copolymer based on a redox catalyst system such ammonium persulfate and sodium metabisulfite. The first reactant mixture contains 10,000 kg of water, 1,120 kg of starch, 1,250 kg of acrylic acid, 350 kg of acrylamide, 2.5 kg of methylene bis-acrylamide, and 7.5 kg of ammonium persulfate maintained at ambient temperature (from about 68° F. to about 86° F.) and the second reactant mixture contains 2 kg of sodium metabisulfite in 50 gallons of water. Streams of the two reactant mixtures are mixed as the streams are added proportionately to the unheated polymerization region 52 of the twin thermal screw and the polymerization is initiated chemically and allowed to proceed to completion in an adiabatic manner. The temperature of the polymerization mixture will typically increase by from about 15° F. to about 30° F. while passing through the polymerization region 52. The polymer formed can be neutralized and dried as in Example 24. Drying can be facilitated by providing additional heating the drying region 56.

If the first reactant mixture is preheated to about 150° F. before mixing with the second reaction mixture, the exothermic polymerization may be chemically initiated and as the temperature increases to the activation temperature, the polymerization may additionally become thermally initiated. A variety of techniques can be utilized to carry out polymerizations proceeding by chemically initiated polymerization, thermally initiated polymerization, and combinations thereof.

Example 27

A sample containing 30 g of cellulose, 125 g of acrylic acid, 25 g of acrylamide, 0.25 g of methylene bis-acrylamide and 0.5 g of ammonium persulfate in 1000 g of water were combined and subjected to an initiation temperature of 186° F. provided by a water bath. The adiabatic polymerization which proceeded provided a graft copolymer based on cellulose, in a manner similar to polymerizations carried out with starch.

Example 28

A hydrated sample of die graft copolymer prepared in Example 11 as exposed to wild microorganisms present in the surrounding air and maintained in the hydrated condition for seven days after which microbial growth on the material's surface was observed. After a total of about 100 days, the microbial growth increased and the copolymer sample was degraded, demonstrating its susceptibility to biodegradation.

Examples 29-34, Utilizing Modified Carbohydrates

Carbohydrates such as starch and/or the amino-substituted carbohydrates can be modified by treatment with oxidizing agents such as peroxides and/or persulfates, or acids such as mineral acids or carboxylic acids. Such modification typically introduces carbonyl groups into the carbohydrate and/or shortens the polymer's chain length. The following reactions illustrate the substitution of chitosan for acrylamide, including the use of a modified chitosan.

Starch was gelatinized, heated to about 140° F., and the modified chitosan added, along with the crosslinker, and the catalyst. Upon the addition of the catalyst, heating was discontinued, and the polymerization proceeded in a substantially adiabatic manner. Preliminary results are provided in the following tables. Table I provides a comparison of graft polymers made utilizing acrylamide, chitosan and modified chitosan. Table II provides a comparison of graft polymers made utilizing a combination of chitosan and a starch including a modified starch.

TABLE IV

| Reaction Variables | Examples | | | | | |
|---|---|---|---|---|---|---|
| | 29 | 30 | 31 | 32 | 33 | 34 |
| Initial Di water | 800 | 800 | 800 | 800 | 700 | 800 |
| Starch (g) | 100 | 125 | 100 | 100 | 100 | 100 |
| Glacial Acrylic acid (g) | 125 | 100 | 125 | 125 | 125 | 125 |
| Acrylamide monomer (g) | 25 | 25 | 0 | 0 | 0 | 0 |
| Cross linker (g) ethacrylamide | 0.25 | 0.25 | 0.25 | 0.25 | 0.1 | 0.1 |
| Chitosan oxidized | 0 | 0 | 0 | 0.5 | 2 | 0 |
| Chitosan native flake | 0 | 0 | 1 | 0.5 | 0 | 6 |
| Catalyst (g) | 0.5 | 0.5 | 0.5 | 0.5 | 0.5 | 0.5 |
| Absorbency g/g | 374 | 253 | 311 | 310 | 315 | 275 |
| wet particle strength | Firm | Soft | Firm | Firm | Rubbery | Tough/slow absorbance |

TABLE V

| Reaction Variables | Examples | | | | | |
|---|---|---|---|---|---|---|
| | 35 | 36 | 37 | 38 | 39 | 40 |
| Initial Di water | 700 | 800 | 800 | 800 | 800 | 800 |
| Starch (g) | 95 | 80 | 100 | 100 | 95 | 95 |
| Starch oxidized | 5 | 20 | 0 | 0 | 5 | 5 |
| Glacial Acrylic acid (g) | 125 | 125 | 125 | 125 | 125 | 125 |
| Acrylamide monomer (g) | 0 | 0 | 0 | 0 | 0 | 0 |
| Cross linker (g) methacrylamide | 0.25 | 0.25 | 0.25 | 0.25 | 0.125 | 0 |
| Chitosan oxidized | 0 | 0.5 | 0 | 0 | 2 | 1 |
| Chitosan, native flake | 1 | 0.5 | 2 | 0 | 2 | 1 |
| Catalyst (g) | 0.5 | 0.5 | 0.5 | 0.5 | 0.5 | 0.5 |
| DI Absorbency, g/g | 310 | 144 | 315 | 364 | 353 | |
| Wet Particle strength | Firm | Soft | Firm | Gel | Firm | Soft |

While the disclosure has been illustrated and described in detail in the figures and foregoing description, the same is to be considered as illustrative and not restrictive in character, it being understood that only selected embodiments have been shown and described and that all changes, modifications and equivalents that come within the spirit of the disclosures described heretofore and/or defined by the following claims are desired to be protected. In addition, all publications cited herein are indicative of the level of skill in the art and are hereby incorporated by reference in their entirety as if each had been individually incorporated by reference and fully set forth.

The invention claimed is:

1. A method for forming a graft copolymer comprising:
    (a) combining water, at least two polysaccharides, at least one α,β-unsaturated carboxylic acid derivative and a catalyst to form a combination having a current temperature and an activation temperature;
    (b) causing the current temperature to sufficiently exceed the activation temperature to thermally initiate a substantially adiabatic polymerization;
    wherein the at least two polysaccharides include a first polysaccharide that is a starch, a second polysaccharide that is a nitrogen-containing polysaccharide; and
    wherein the α,β-unsaturated carboxylic acid derivative is selected from the group consisting of an acid, an ester, an amide, an amidine, and a salt.

2. The method of claim 1, wherein combining a first polysaccharide that is a starch involves combining a modified starch, wherein the modified starch is selected from the group consisting of an oxidized starch, an acid treated starch, and a combination thereof.

3. The method of claim 1, wherein combining a second polysaccharide that is a nitrogen-containing polysaccharide involves combining a modified nitrogen-containing polysaccharide.

4. The method of claim 3, wherein combining a modified nitrogen containing polysaccharide involves combining a modified nitrogen-containing polysaccharide selected from the group consisting of an oxidized nitrogen-containing polysaccharide, an acid modified nitrogen-containing polysaccharide, and combinations thereof.

5. The method of claim 1, wherein combining a second polysaccharide that is a nitrogen-containing polysaccharide involves combining an amine-substituted polysaccharide.

6. The method of claim 5, wherein combining an amine-substituted polysaccharide includes combining a modified amine-containing polysaccharide.

7. The method of claim 6, wherein combining a modified amine-containing polysaccharide includes combining a modified amine-containing polysaccharide selected from the group consisting of an oxidized amine-containing polysaccharide, an acid modified amine-containing polysaccharide, and combinations thereof.

8. The method of claim 5, wherein combining an amine polysaccharide includes combining an amine polysaccharide selected from the group consisting of:

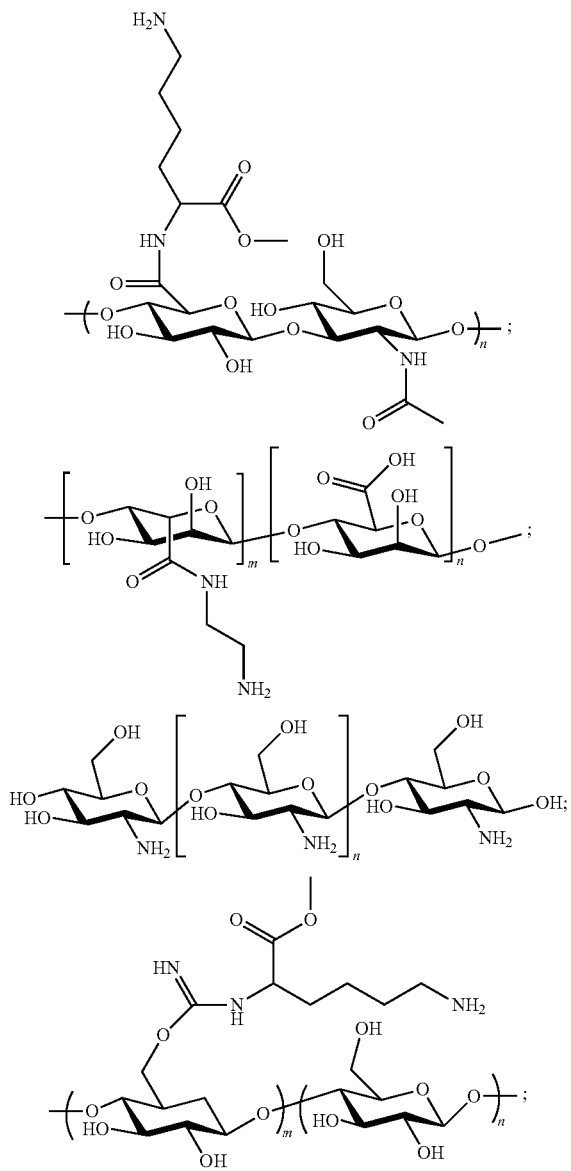

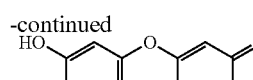

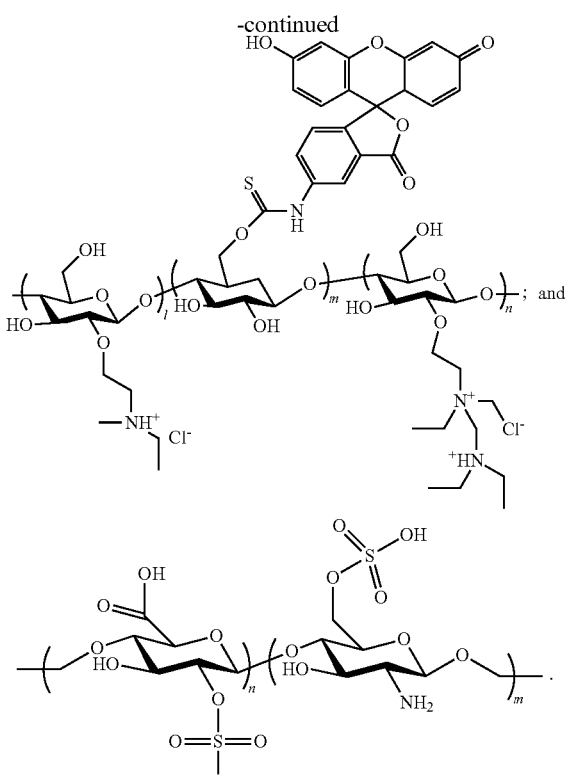

9. The method of claim 1, wherein combining water, at least two polysaccharides, at least one α,β-unsaturated carboxylic acid derivative and a catalyst to form a combination, further includes combining a cross-linking agent.

10. The method of claim 9, wherein combining a cross-linking agent includes combining a cross-linking agent selected from the group consisting of N,N'-methylenebis(meth)acrylamide, glycidyl methacrylate, lysine, histidine and arginine.

11. The method of claim 1, wherein combining an α,β-unsaturated carboxylic acid derivative selected from the group consisting of an acid, an ester, an amine, an amidine, and a salt includes combining acrylic acid.

12. The method of claim 1, wherein causing the current temperature to sufficiently exceed the activation temperature to thermally initiate a substantially adiabatic polymerization occurs in a vessel selected from the group consisting of a thermal screw, a heated drum reactor, a belt reactor, a stirred vessel, and an unstirred vessel.

13. A method for forming a graft copolymer comprising:
(a) combining water, a modified polysaccharide, at least one α,β-unsaturated carboxylic acid derivative and a catalyst to form a combination having a current temperature and an activation temperature;
(b) causing the current temperature to sufficiently exceed the activation temperature to thermally initiate a substantially adiabatic polymerization;
wherein the α,β-unsaturated carboxylic acid derivative is selected from the group consisting of an acid, an ester, an amide, an amidine, and a salt, and
wherein the modified polysaccharide is selected from the group consisting of an oxidized polysaccharide, an acid treated polysaccharide, and a combination thereof.

14. The method of claim 13, wherein the step of combining a modified polysaccharide includes combining a modified starch.

15. The method of claim 13, wherein the step of combining a modified polysaccharide includes combining a modified nitrogen-containing polysaccharide.

16. The method of claim 15 wherein the step of combining a modified nitrogen-containing polysaccharide includes combining a modified nitrogen-containing polysaccharide selected from the group consisting of an oxidized nitrogen-containing polysaccharide, an acid-modified nitrogen-containing polysaccharide, and combinations thereof.

17. The method of claim 15, wherein the step of combining a modified nitrogen-containing polysaccharide includes combining a modified amine-containing polysaccharide.

18. The method of claim 17, wherein combining a modified amine-containing polysaccharide, includes combining a modified amine-containing polysaccharide selected from the group consisting of an oxidized amine-containing polysaccharide, an acid modified amine-containing polysaccharide, and combinations thereof.

19. The method of claim 13, wherein combining an α,β-unsaturated carboxylic acid derivative selected from the group consisting of an acid, an ester, an amine, an amidine, and a salt includes combining acrylic acid.

20. The method of claim 13, wherein combining water, a modified polysaccharide, at least one α,β-unsaturated carboxylic acid derivative and a catalyst, further includes combining a cross-linking agent.

21. The method of claim 20, wherein combining a cross-linking agent includes combining a cross-linking agent selected from the group consisting of N,N'-methylenebis(meth)acrylamide, glycidyl methacrylate lysine, histidine and arginine.

22. A method for forming a graft copolymer comprising:
(a) combining water, at least one polysaccharide, and at least one α,β-unsaturated carboxylic acid derivative to form a combination having a current temperature,
(b) providing a catalyst having an activation temperature;
(c) causing the combination's current temperature to be at least equal the catalyst's activation temperature; and
(d) introducing the catalyst to the combination having a current temperature of at least the catalyst's activation temperature to thermally initiate a substantially adiabatic polymerization;
wherein the α,β-unsaturated carboxylic acid derivative is selected from the group consisting of an acid, an ester, an amide, an amidine, and a salt, and
wherein the at least one polysaccharide is selected from the group consisting of an oxidized polysaccharide, an acid treated polysaccharide, a nitrogen-containing polysaccharide, and a combination thereof.

* * * * *